US009916590B2

(12) United States Patent
Brogan et al.

(10) Patent No.: US 9,916,590 B2
(45) Date of Patent: Mar. 13, 2018

(54) ANALYTIC SERVICES PORTAL

(75) Inventors: Tom Brogan, Ottawa (CA); Michael Brogan, Ottawa (CA); Chris Fraelic, Kanata (CA); Matt Dobinson, Ottawa (CA); Roberto Soto, Nepean (CA); Tina Perkins, Ottawa (CA); Trent Peckham, Dunrobin (CA)

(73) Assignee: Quintiles IMS Incorporated, Danbury, CT (US)

( * ) Notice: Subject to any disclaimer, the term of this patent is extended or adjusted under 35 U.S.C. 154(b) by 912 days.

(21) Appl. No.: 13/468,890

(22) Filed: May 10, 2012

(65) Prior Publication Data

US 2013/0013329 A1 Jan. 10, 2013

Related U.S. Application Data

(60) Provisional application No. 61/484,473, filed on May 10, 2011.

(51) Int. Cl.
*G06Q 10/00* (2012.01)
*G06Q 30/02* (2012.01)

(52) U.S. Cl.
CPC .................. *G06Q 30/02* (2013.01)

(58) Field of Classification Search
CPC ..... G06Q 10/00; G06C 30/02; G06C 30/0205
USPC ........................................................ 705/2–3
See application file for complete search history.

(56) References Cited

U.S. PATENT DOCUMENTS 7,174,304 B1 2/2007 Boardman
7,899,686 B1* 3/2011 Akers .................. G06F 19/328
  600/300
2008/0294996 A1* 11/2008 Hunt ...................... G06Q 30/02
  715/739
2010/0161816 A1 6/2010 Kraft et al.

FOREIGN PATENT DOCUMENTS

CN         1996293         7/2007
WO     2006009480 A1      1/2006

OTHER PUBLICATIONS

Notification of Transmittal of the International Search Report and the Written Opinion of the International Search Authority, or the Declaration, dated Aug. 1, 2012 in International Application No. PCT/US12/37354, 9 pages.
Office Action and Search Report in Chinese Application No. 201280034282.6, dated Apr. 1, 2016, 32 pages, with English Translation.

* cited by examiner

*Primary Examiner* — Joy Chng
(74) *Attorney, Agent, or Firm* — Fish & Richardson P.C.

(57) ABSTRACT

Provided are methods and systems for providing analytic services, as well as computer programs encoded on computer storage devices and configured to perform the actions of the methods. One or more processors create an alignment associated with a client, where the alignment organizes data in a database, and where the data in the database comprises prescription information, store information, and product information. A request for a report is received, where the request identifies the client. The requested report is generated based on the alignment, where the report comprises one or more indicators derived from data contained in the database.

15 Claims, 25 Drawing Sheets

Top Therapeutic Classes & Top Products — 1002

| | Scripts | Growth | Share | Chng. | | Scripts | Growth | Share | Chng. |
|---|---|---|---|---|---|---|---|---|---|
| Class 1 | 470 | -1.5% | 19.20% | ▲ 0.31 | Product 1 | 144 | 8.8% | 19.90% | ▲ 0.14 |
| Class 2 | 419 | 8.2% | 18.77% | ▽ -0.19 | Product2 | 133 | -1.3% | 23.94% | ▽ -0.01 |
| Class 3 | 416 | 9.8% | 22.29% | ▲ 0.41 | Product3 | 79 | 7.5% | 21.38% | ▲ 0.34 |
| Class 4 | 313 | 5.6% | 19.63% | ▲ 0.03 | Product4 | 84 | 6.8% | 19.74% | ▲ 0.02 |
| Class 5 | 203 | 13.0% | 16.85% | ▽ -0.51 | Product5 | 82 | 13.5% | 19.92% | ▲ 0.52 |

Add in Option to Select Specific Classes or Products

Fastest Growing Therapeutic Classes & Products — 1004

| | Scripts | Growth | Share | Chng. | | Scripts | Growth | Share | Chng. |
|---|---|---|---|---|---|---|---|---|---|
| Class 1 | 470 | -1.5% | 19.20% | ▲ 0.31 | Product 1 | 144 | 8.8% | 19.90% | ▲ 0.14 |
| Class 2 | 419 | 8.2% | 18.77% | ▽ -0.19 | Product2 | 133 | -1.3% | 23.94% | ▽ -0.01 |
| Class 3 | 416 | 9.8% | 22.29% | ▲ 0.41 | Product3 | 79 | 7.5% | 21.38% | ▲ 0.34 |
| Class 4 | 313 | 5.6% | 19.63% | ▲ 0.03 | Product4 | 84 | 6.8% | 19.74% | ▲ 0.02 |
| Class 5 | 203 | 13.0% | 16.86% | ▽ -0.51 | Product5 | 82 | 13.5% | 19.92% | ▲ 0.52 |

Physician Information 1508

Who are your Top Prescribers...

| Last Name | First Name | Primary Specialty | Physician's Total Scripts | Physician's Scripts Filled in your Pharmacy | Share of Physician's Scripts |
|---|---|---|---|---|---|
| Smith | John | Cardiology | 9,235 | 6,100 | 67.2% |
| Doe | Jane | General Practice | 8,912 | 6,550 | 58.0% |
| Lowe | Kelly | General Practice | 5,750 | 5,150 | 89.0% |

1526

Where's your Opportunity...

| Last Name | First Name | Primary Specialty | Physician's Total Scripts | Physician's Scripts Filled in your Pharmacy | Share of Physician's Scripts |
|---|---|---|---|---|---|
| Roy | Eric | General Practice | 7,500 | 50 | 0.7% |
| Oz | Emily | Pediatrics | 5,210 | 201 | 3.9% |
| Leland | Derrick | General Practice | 3,600 | 25 | 0.6% |

1528

| Hierarchy Example #1 |
|---|
| National |
| Region |
| Province |
| Grouped Territory |
| Territory |
| Grouped CMA |
| CMA |
| District |
| Grouped FSA |
| Store |

1902

| Hierarchy Example #2 |
|---|
| National |
| National |
| National |
| National |
| National |
| Region |
| Province |
| Senior Director |
| Director |
| Store |

ANALYTIC SERVICES PORTAL

CROSS-REFERENCE TO RELATED APPLICATION

This application claims priority to U.S. Application Ser. No. 61/484,473, filed on May 10, 2011, entitled BUSINESS INTELLIGENCE PORTAL, the disclosure of which is incorporated herein by reference.

BACKGROUND

The present invention relates to techniques for analysis of health care and pharmaceutical data.

Companies are increasingly interested in analyzing the financial information connected with their business. Prescription data records that are generated by retail pharmacies or hospital dispensaries, for example, when they fill prescriptions for clients, may contain labels or data fields that include, among other data, the identity of the drug being dispensed, the name of the filling location, and information identifying the party responsible for authorizing and/or making payments for the prescriptions. Useful market intelligence may be derived from statistical or other analysis of this data. Accordingly, there exists a need for an improved technique for using this information to provide useful market intelligence.

SUMMARY

The disclosed system and method relate to a portal for providing clients with business planning insights and analytic services. In one embodiment, the portal provides pharmacies with a portal for comparing their performance with the performance of competitor stores in a relevant market. One or more alignments may be used to generate a report for user access. The report may include information related to the client's performance against the market. The report may also provide key performance indicators and business insights, and indicate where the client may have opportunities to improve their performance. The disclosed system and method use technical means to solve technical problems, and result in multiple technical effects, including quickly and accurately deriving information from data in a database, and reporting the derived information to a user.

BRIEF DESCRIPTION OF THE DRAWINGS

FIG. 10 illustrates one embodiment of a report generated in connection with the disclosed subject matter.

FIG. 19 shows two possible geographic hierarchies that can be used in connection with one embodiment of the disclosed subject matter.

DETAILED DESCRIPTION

Figure 1:
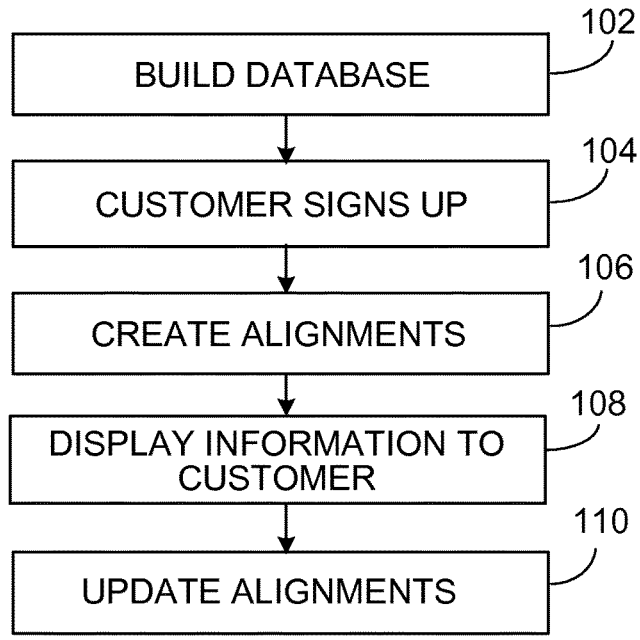
FIG. 1 is a flow chart describing an overview of the process of one embodiment of the disclosed subject matter.

The subject matter disclosed herein is generally directed to a system and method for providing a client with business planning insights and analytic services. More specifically, the subject matter is generally directed to a portal for providing a client with such services. One embodiment of the system and method is illustrated in FIG. 1. A provider builds a database of relevant information at 102. A client enrolls in the program at 104. The provider creates at least one alignment for the client at 106. Information related to the alignments can be displayed to the customer at 108. Finally, the alignments can be periodically updated at 110.

In order to provide the appropriate information to a client, a provider must first assemble the necessary information in a database. In one embodiment, the provider assembles the database and stores the information at a provider location. However, in other embodiments, the database can be assembled and/or stored by a third party, as long as the provider has access to the information in the database. The database may be a single collection of data. In other embodiments, however, the database may be two or more storage devices located remotely from each other, as long as the provider has access to the data stored therein.

The information contained in the database will depend on what type of information the provider intends to provide to the client. For example, in one embodiment the portal is intended for use by retail pharmacies. In such an embodiment, the database may include pharmacy data and claims data for both the most recent reporting period and a number of historical periods. The database may also include any other relevant data related to pharmacies and prescriptions.

For example, the database may include location information for each pharmacy in the relevant market. The data stored in the database may include one or both of actual and projected filled prescription volume, volume change, market share, market share change, dollars of sales, and number of units sold of pharmacy drug products. The database may be supplemented by pharmacy data from individual pharmacies or chains. For example, the client may be required or asked to provide certain data when enrolling in the service. The database may also include information regarding the number of outlets currently in operation. However, the disclosed subject matter is not limited to applications in the pharmacy field, and can be used with a wide range of other businesses.

The database may include data associated with each competitor store. A competitor store, as used herein, refers to any store in a particular competitive field. The definition of a competitive field will generally be determined by the provider. For example, in one embodiment the competitive field is the retail pharmacy field, and a competitor store can include every store that sells prescriptions to the general public. This can include both standalone pharmacies and large stores (e.g., grocery stores) with a pharmacy section. In other embodiments, the competitor stores may be limited to only standalone pharmacies.

For each store determined to be a competitor store, the provider may build a profile associated with that store. However, it should be understood that such a profile is not strictly necessary. Instead, the data related to a particular store may be spread throughout the database until a geographic alignment is created. In some embodiments, the store profile is stored as part of a generic geographic alignment.

Figure 2:
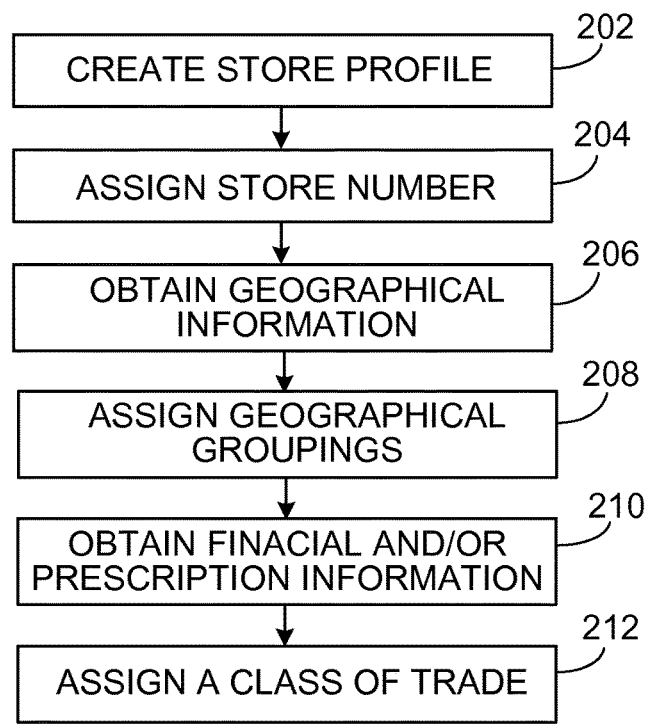
FIG. 2 is a flow chart describing the creation of a store profile in connection with one embodiment of the disclosed subject matter.

FIG. 2 illustrates one embodiment of the process used for constructing a store profile. At 202, the provider creates an empty store profile associated with the identified competitor store. The empty profile will generally include the name of the store, but no additional information. The provider can assign a store number to the competitor store at 204, and store that information in the store profile.

At 206, the provider obtains geographic information associated with the competitor store. This geographic information may be, for example, the address of the competitor store. However, other geographic information may be used instead. For example, in one embodiment of the disclosed subject matter, the name of the city or town in which the competitor store is located may be sufficient.

The provider can use the geographic information to assign geographic groupings to the store at 208. Each of these geographic groupings may be data fields in the store profile. For example, in one embodiment the store profile includes the data fields NATIONAL, REGION, STATE, and MUNICIPAL. NATIONAL is the country in which the competitor store is located. If the portal is intended for use only in a single country, this data field may include the same value (e.g., NATIONAL), for all categories. REGION is a subnational category that is larger than the STATE grouping. For example, the possible data values for the REGION data field may be limited to EAST or WEST. In another embodiment, a country may be broken into a number of regions. For example, in the United States the possible data values for the REGION data field may include NORTHEAST, MID-ATLANTIC, SOUTH, MIDWEST, MOUNTAIN, SOUTHWEST, and PACIFIC NORTHWEST. In general, the provider can determine which groupings are appropriate for this data field. The STATE data field identifies the state or province in which the competitor store is located. The store profile may, alternatively or additionally, include a modified state data field in which certain small states or provinces are consolidated into a single grouping. For example, the provinces of Newfoundland and Prince Edward Island may be combined to form a NL+PE grouping. The MUNICIPAL data field can be the name of the city in which the competitor store is located. The store profile may, alternatively or additionally, include a modified municipal data field. For example, the modified municipal data field may be based on the Census Metropolitan Area (CMA) in Canada. Moreover, the municipal data field may need to be further modified. For example, an adjusted CMA may be used in Canada in order to satisfy confidentiality requirements, because there may not be enough competitor stores in a CMA to mask certain elements of their identity. While certain geographic groupings have been identified in connection with one embodiment of the store profile, additional groupings may also be used. These groupings may be based on, for example, the postal code associated with the competitor store, or the county in which the competitor store is located. Various countries have additional geographic or administrative divisions which may be used as geographic groupings. These geographic groupings are subsequently stored in the store profile.

The provider can obtain financial and/or prescription information about the competitor store at 210. This information may include the total number of prescriptions filled by the pharmacy in a given time period, the total dollar amount of the prescriptions filled by the pharmacy, the number of prescriptions filled for each product, the price charged by the pharmacy for each product, demographic information about the customers for the store (e.g., the age of the customer buying each prescription), and any other relevant information. Some or all of this information may not be available for any or all stores, in which case projected data or market data may need to be used instead. Any information obtained by the provider can be stored in the store profile. In other embodiments, however, the financial and/or prescription information is not stored in the store profile. Instead, such information is retrieved from the database as needed.

A class of trade for the competitor store is assigned at 212. The class of trade generally describes the different types of competitor stores. For example, in one embodiment each competitor store is identified as one of INDEPENDENT (as independent or single location pharmacy), CHAIN/BANNER (a location of a large pharmacy chain), or FOOD/MASS (a pharmacy located in a grocery store or the like). However, other class of trade designations can also be used.

Other information can also be added to the store profile and used in the analytics. For example, the store profile can also include the location status (i.e., whether the location is open, closed, or invalid) and an indication of how long the competitor store has been open.

The database may also include a product profile for at least one product. However, such a profile is not strictly necessary. Instead, the data for a particular product may be dispersed throughout the database until a product alignment is created. In some embodiments, the product profile is stored as part of a generic product alignment.

Figure 3:
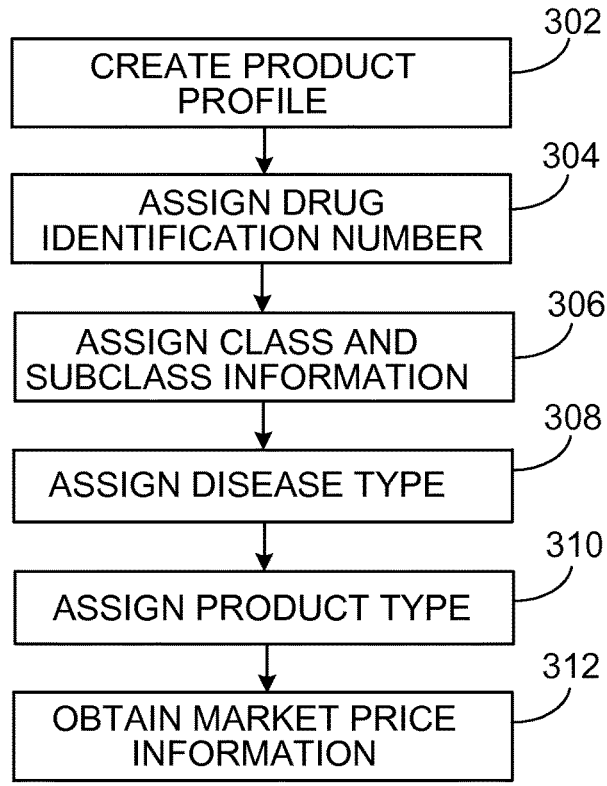
FIG. 3 is a flow chart describing the creation of a product profile in connection with one embodiment of the disclosed subject matter.

For example, the database may include a product profile for every drug on the market. One embodiment of the process for constructing a product profile is illustrated in FIG. 3. The provider first creates a product profile associated with a drug at 302. The product profile includes the name of the drug. For example, the product profile may include both the trade name and the scientific name of the drug. The provider can assign a drug identification number to the drug at 304.

The provider can assign class and subclass information to the drug at 306. The classes and subclasses used in the database can be assigned in any manner. For example, Lipitor is a HMG-CoA reductase inhibitor that slows the production of cholesterol in the body and is used to treat heart disease. As such, Lipitor may be grouped in the Cardiovascular Drugs class and the Antilipemic and Atherosclerosis Inhibiting Agents subclass. In some embodiments, a drug may be assigned to multiple classes and subclasses. In other embodiments, a drug can be assigned to more than one subclass within a single class, and to any subset of a subclass.

The provider can assign a disease type to the drug based on the disease the drug is used to treat at 308. In one embodiment, the disease type may be one of acute and chronic. The provider also assigns a product type to the drug at 310. The product type will generally be either brand or generic. For example, the product type data field may have a value of 1 if the product is a brand, and 0 if the product is generic. Other disease types and product types may also be used in connection with the portal.

Finally, the provider obtains the market price of the product at 312. The market price may be obtained from a number of sources by any means known in the art. The market price may, for example, be a weighted average of prices obtained from a plurality of sources. This information is stored in the product profile. Any additional information related to a particular product can also be included in the product profile.

Figure 4:
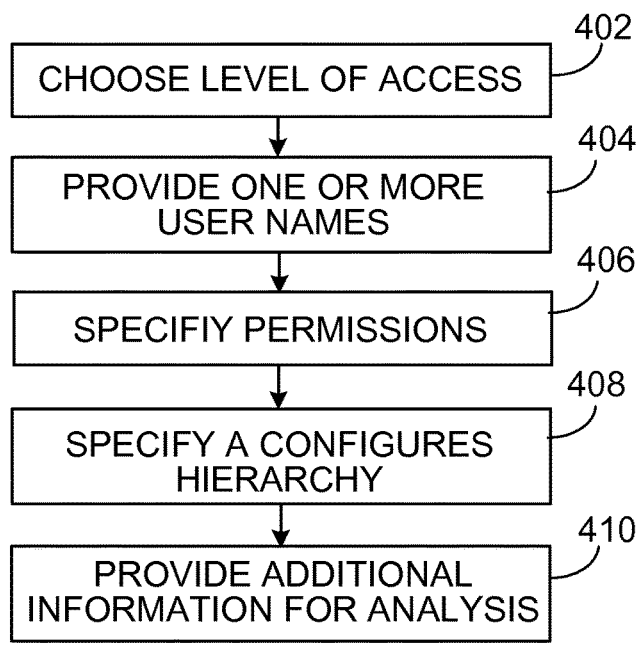
FIG. 4 is a flow chart describing one embodiment of the customer registration process.

Once the database has been assembled, the provider offers access to the portal to clients. With reference to FIG. 1, the client enrolls with the provider at 104. One embodiment of the enrollment process is illustrated in FIG. 4.

In the illustrated embodiment, the provider offers various levels of access. For example, Tier 1 access may include a base level of information and analysis, while Tier 2 may include more advanced information and analysis and may include additional interactive features. The client chooses a preferred level of access at 402.

The client can identify one or more user names at 404. Each of the user names will be associated with the client, and may be used by one or more people. For example, each branch or office may have an individual user name, such that every employee of a store located in Chicago would use the ChicagoBranch user name, and every employee of the head office could use the HeadOffice user name. Alternatively, each person authorized to access the portal may have an individual user name.

The client also specifies the permissions for each of the user names at 406. Permissions generally describe what level of access a user associated with a particular user name is given. For example, the ChicagoBranch user name may be limited to viewing information about a specific store, while the HeadOffice user name can access information about any store or group of stores. Similarly, the Southwest regional director may have a user name which allows him or her to see any of the stores in the Southwest region, but none of the stores outside of that region. In one embodiment, the client may create one or more configuration profiles and assign each user name to one of the configuration profiles. For example, the client may have two configuration profiles: a head office user, and a store user. The head office user's view of the data will generally be different than that of a store user. For example, a user with a store user configuration profile will be limited to information related to that user's location only and cannot roll up to higher geographical or product levels. For example, in another embodiment, the southwest region director and the northeast regional director may both be assigned a regional director configuration profile, but the other permissions associated with their user names will prevent each from viewing any stores outside his or her region. Using the configuration profiles or otherwise specifying permissions for each user name, the client may be able to limit the user to one of a standard or configured geographic hierarchy, a standard or configured product hierarchy, a monthly or quarterly report, whether competitors are defined on the basis of classes of trade or a trade area, and whether the user can access different tiers of reports.

The client can specify a configured hierarchy at 408. Each hierarchy includes a number of levels at which data can be viewed. For example, the standard geographical hierarchy may allow the client to compare its stores to other stores in a local area, in a state, in a region, or in a country. However, the client may wish to view data based on some other geographic level. For example, the client may wish to compare stores managed by a particular regional director against other stores in those regions. The client will therefore specify that the configured geographic hierarchy should include a regional director category. The client can provide a breakdown of which stores are associated with the regional director as well as what territories to use for comparison. Similarly, the client may wish to compare itself against other stores in the county, which may not be included in the standard geographical hierarchy.

The client also provides specific information about each store at 410. This information may include information about the prescriptions filled at each store. For example, the client may provide the total number of prescriptions filled by each store in a given time period, the total dollar amount of the prescriptions filled by each store, the number of prescriptions filled for each product at each store, the price charged by each store for each product, demographic information about the customers for each store (e.g., the age of the customer buying each prescription), and any other relevant information. This information can be used to analyze the store's performance relative to the market. If this information has already been obtained by the provider through other means, the client will not be required to provide it to the portal provider.

With reference to FIG. 1, the provider then proceeds to create the alignments. An alignment, as used herein, refers to a collection of data that can be used to organize the data from the database in a particular manner. For example, the geographic alignment is used to organize the data from the database based on the location of various stores. The time alignment is used to organize the data from the database based on time.

Figure 5:
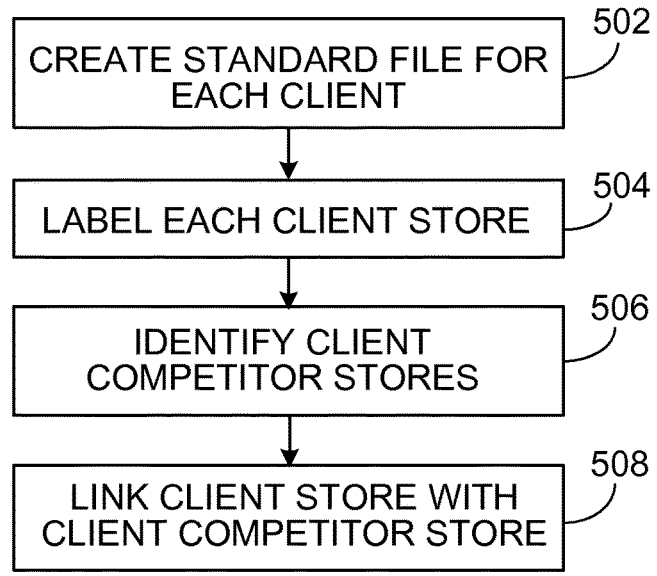
FIG. 5 is a flow chart describing the creation of a geographic alignment in connection with one embodiment of the disclosed subject matter.

One embodiment of the process used to create the geographic alignment is illustrated in FIG. 5. In this embodiment, the geography alignment contains information on all retail business locations in the database. If a profile of each store has been created, this information is used to create the alignment. Otherwise, the information is dispersed throughout the database and is collected to create the geographic alignment. The geography alignment may also include information for all locations that have moved or been closed during the study period, as well as how long each store has been opened. This additional information may be used, for example, in determining the outlet store count or calculating organic versus non-organic business.

The provider creates a standard file for the client at 502. The standard file includes a list of all the competitor stores in the database. The standard file may include a number of data fields similar to those described above in relation to a store profile. The standard file may, for example, include data fields for a provider's numeric identifier for each location (LOCATIONID), the textual name for the location (NAME), the location's banner or chain name (CHAINNAME), a client-assigned number attached to the location (STORENUMBER), the street address for the location (ADDRESS), the name of the city in which the location resides (CITY), a region designation (REGION), a state or province designation (PROV), a national designation (NATIONAL), the longitude for the location (LONGITUDE), the latitude for the location (LATITUDE), the location's assignment to one of CHAIN/BANNER, FOOD/MASS, or INDEPENDENT (CLASS OF TRADE), an indication of whether the location is open, closed, or invalid (LOCATION STATUS), an indication of whether a location is active, new, or dropped from the report (STATUS), whether a store is an actual store or projected (ACTUAL), the date the store was added to the database (ADDED DATE), the date the store was dropped from the database (DROPPED DATE), and an indication of how long the store has been opened (OPEN_MONTHS). The standard file may also include additional geographic information or any other store information required by the provider. The standard file should also include data fields for any additional geographic categories specified by the client for the configured geographic hierarchy.

This list is modified at 504 to label each client store. For example, the standard file may include a class of trade data field. In one embodiment, this class of trade data field is modified to identify each client store not as INDEPENDENT, BANNER/CHAIN, or FOOD/MASS, but as CLIENT.

For every client store, one or more client competitor stores is identified at 506. In one embodiment, the client identifies client competitor stores for each client stores. However, in other embodiments, the provider identifies a set of client competitor stores for each client store based on objective data. For example, the provider may identify client competitor stores based on the proximity of other stores to the client competitor stores. The provider may, for example, identify the 5, 6, 7, 8, 9, or 10 closest stores as client competitor stores. In another embodiment, the provider identifies the 5, 6, 7, 8, 9, or 10 closest stores in each class of trade as client competitor stores. In other embodiments, the percentage of stores of each class of trade can be based on the client's preference, on the percentage of stores of each class of trade in a certain area, or on any other metric. The numbers presented here are exemplary only. Any number of stores can be identified as client competitor stores for a particular client store, although the analysis may be less useful if the number is large. The number of stores identified by either the client or provider may be required to be over a minimum number defined by the provider. For example, the provider may require that the number of client competitor stores be over a certain number (e.g., six) in order to meet confidentiality requirements.

Finally, the provider links each client store with the one or more identified client competitor stores at 508. This may be accomplished, for example, by creating a new data field for each store listed in the file. The new data field, TARGET PHARMACY NAME, identifies the client store for which the store has been identified as a client competitor store. This field may be left blank for each client store. However, in other embodiments, a first client store may be identified as a client competitor store for a second client store. This field may also be left blank for any store that has not been identified as a client competitor store for any client store. However, there may be certain stores that have been identified as client competitor stores for two or more client stores. In one embodiment, multiple stores may be identified in the TARGET PHARMACY NAME data field. In other embodiments, a second entry or file or profile is created for the client competitor store in order to link the client competitor store with a second client store.

The modified alignment file may be saved as a new file such that two versions of the file exist: a standard alignment file and a modified alignment file.

The modified alignment file may also contain data fields related to the configured hierarchies specified by the client. For example, if the client has specified that the configured geographic hierarchy should include a DIRECTOR field, each competitor store will include a DIRECTOR data field including the name of the director responsible for the area in which the competitor store is located.

A product alignment may also be created. The product alignment may include a number of data fields similar to those described above in relation to a product profile. The data fields may include a provider-assigned numeric product identifier for one or more drugs (PRODUCT ID), a provider-assigned numeric product identifier for each individual drug (DRUG ID), a name descriptor for the product (TRADE NAME), a chemical name for the product (CHEMICAL NAME), the quantity/potency of the product (STRENGTH), the form of delivery for the product (FORM), the name of the supplier (SUPPLIER), an indication of whether the product is generic (GENERIC INDICATOR), an indication of the characteristics of the product (DRUG STATUS), an numeric identifier for the class (CLASS NUMBER), a text identifier for the class (CLASS NAME), a numeric identifier for the subclass (SUBCLASS NUMBER), a text identifier for the subclass (SUBCLASS NAME), and a grouping to identify which products are used for non-chronic therapies versus chronic therapies (CHRONIC).

Other alignments that may be used in connection with the disclosed subject matter include moved stores and time alignments. The moved stores contains supplementary historical information for stores that have moved locations, and is generally used to augment fact data in order to account for the volume of the moved store. The time alignment defines various time periods used in connection with the portal. The time alignment may be defined by the subscription that the client purchases, such that a time alignment for a client that purchases reports based on 24 months of data contains 24 months of data.

The alignment files are used to generate the reports that are displayed to the client. The portal may include an email notification system which sends an email to the client when the reports are ready to view.

Figure 6:
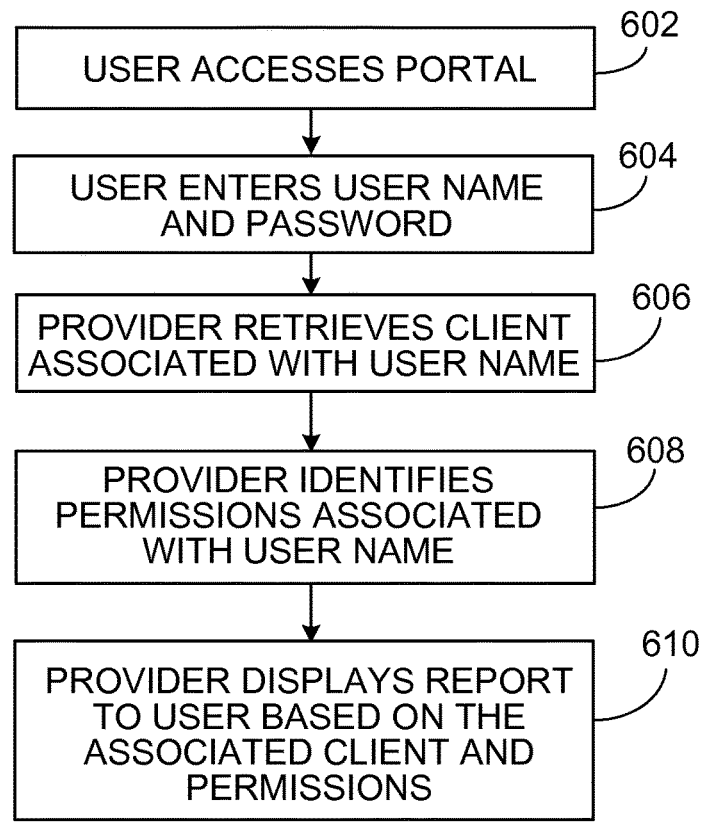
FIG. 6 is a flow chart describing the user log-in procedure in connection with one embodiment of the disclosed subject matter.

After the client enrolls with the provider, the client can access the portal to view information associated with one or more alignments. This information may be displayed in the form of a report. One embodiment of the process used to access such a report is illustrated in FIG. 6. A user accesses the portal at 602. This will typically be done through a website operated by the provider which the user can access online. However, in other embodiments, the user may access the portal through a specialized computer terminal provided by the provider. Any other communication method known in the art can also be used to access the portal.

The user can enter a user name and password at 604. If the user name and password do not match a user name and password stored by the provider, access is denied. If the user name and password are accepted by the provider, the provider identifies the client associated with the user name at 606. The provider also identifies the permissions associated with the user name at 608. Finally, the provider displays a report to the user based on the associated client and the identified permissions. For example, if the user name is associated with the Acme Pharmacy, a report for Acme Pharmacy will be displayed to the user.

Each client may be able to save certain preferences for report viewing. For example, a user may be able to select and save a preferred language for viewing the reports. In other embodiments, certain default settings may be saved. For example, the customer may be able to select and save certain default settings for the displayed to the user, especially if filters are available to the user.

FIGS. 7-17 and 20-21 illustrate various embodiments of the reports that can be displayed to the user.

Figure 7:
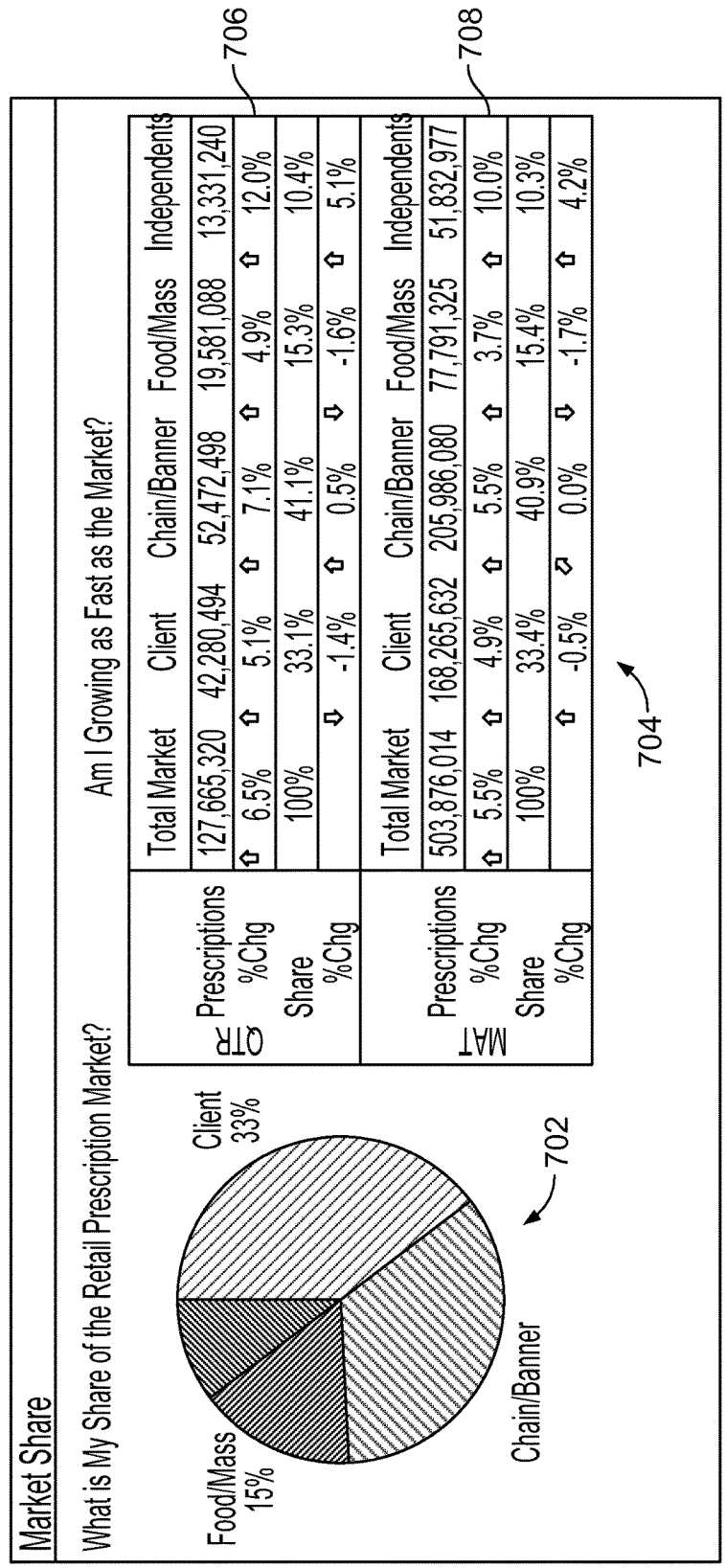
FIG. 7 illustrates one embodiment of a report generated in connection with the disclosed subject matter.

FIG. 7 illustrates one embodiment of a market share report that can be displayed to the user. A market share report may include any information related to the client's share of a relevant market. Relevant market, as used herein, refers to all competitor stores that share a particular value in a data field in the geographic alignment. Data values shown in the report may include total prescription count, dollar amount of prescriptions, market share of total prescription count and/or dollar amount of prescriptions, percent change for any of these values. (Dollar amount may be the actual dollar amount of the prescriptions, or an estimate based on the prescription count and market price data). The data values may be presented for and in relation to any time period, such as quarterly (where the percent change reflects the change from the last quarter) or MAT.

The market share report illustrated in FIG. 7 includes a market share chart 702 and a market share table 704. The market share chart 702 shows the client's percentage of the retail market. The market share chart 702 also illustrates the market shares for other stores broken down by class of trade. In other embodiments, the chart may show the market share of the client versus the rest of the market as a whole. In addition, the data can be presented in numerous forms, including, for example, other types of charts, graphs, or tables. Market share table 704 illustrates the growth of the client as compared to the rest of the market. This table is broken down into two time periods. The quarter table 706 shows the growth of the client as compared to the rest of the market in the last quarter. The Moving Annual Total (MAT) table 708 shows the growth of the client as compared to the rest of the market over the last year.

The charts in FIG. 7 are based on the share of a particular retail market. The market used for these calculations may be determined by the permissions identified by the client. For example, if the permissions specify that a certain user name can only see the data associated with a single store, the market share chart 702 may show the market share for that store as compared to the market data for stores identified as competitor stores. In another embodiment, the user may be able to select from a number of different geographic groupings, and the data will dynamically update based on the new settings. In one embodiment, the provider may offer two or more tiers, and the option to select a geographic grouping will be available only in certain of the tiers.

The market share calculated in connection with FIG. 7 is based on the number of prescriptions filled by the pharmacy, as shown in market share table 704. In another embodiment, the market share is calculated based on the total cost of the prescriptions filled by the client. In another embodiment, the user may be able to select whether the market share data is based on total prescriptions filled or the cost of prescriptions filled. For example, the user may be presented with a dropdown box for choosing a metric for calculating market share.

Figure 8:
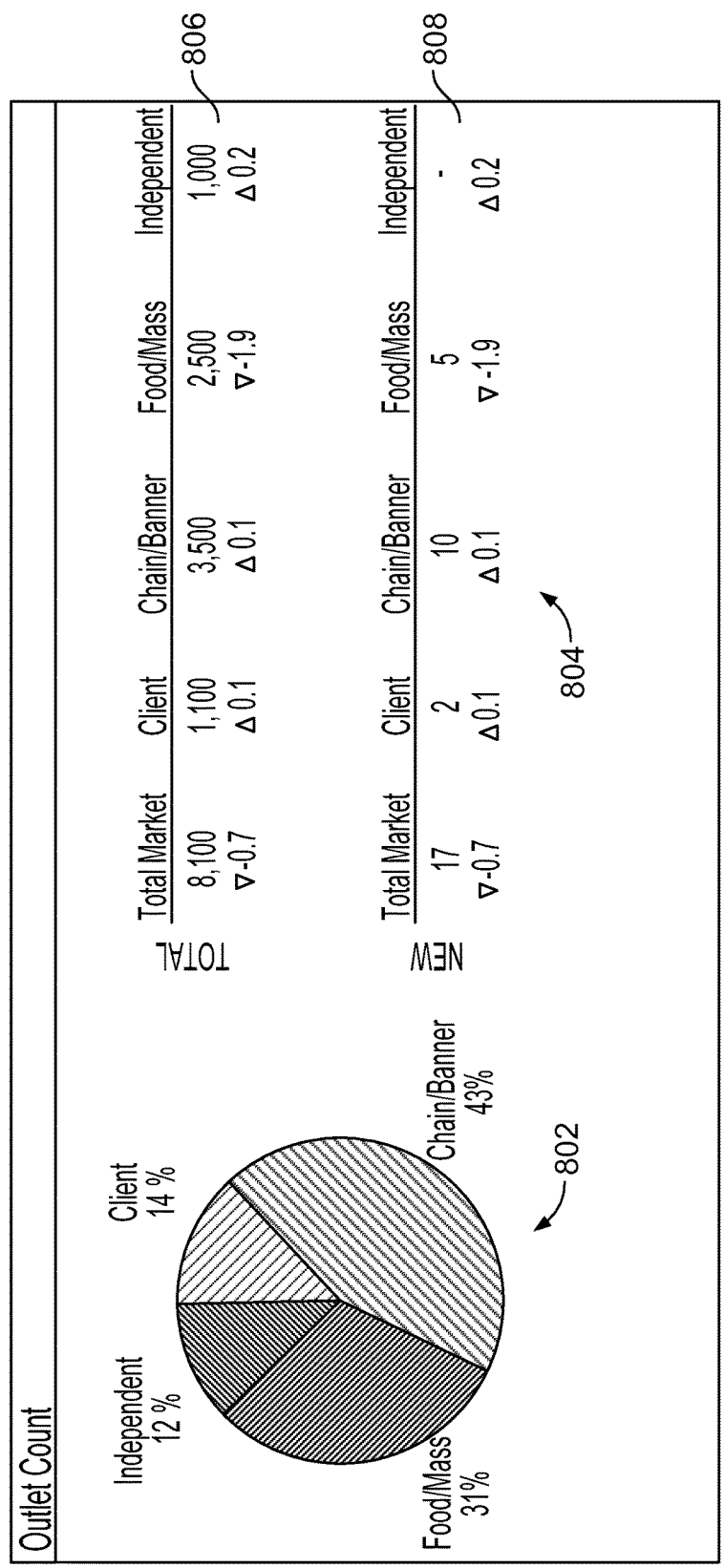
FIG. 8 illustrates one embodiment of a report generated in connection with the disclosed subject matter.

FIG. 8 illustrates one embodiment of the outlet count report. The outlet count report may include any information related to the number of operating competitor stores, including a count of the number of stores in the relevant market, a count of new locations in the relevant market, and the proportion of change in the share of outlets for the most recent period when compared with the previous period, or the same period from the year prior.

FIG. 8 includes an outlet count chart 802, which shows the total number of store operated by the client as compared to the total number of non-client stores. The non-client stores may be broken out by class of trade. The outlet count report also includes an outlet count table 804. The outlet count table 804 may include a total outlet count table 806 that shows the number of total stores for the client as compared to the rest of the market. The outlet count data table may also include a new outlet count table 808 that shows the number of new stores opened by the client as compared to the number of new stores opened by the rest of the market.

Figure 9:
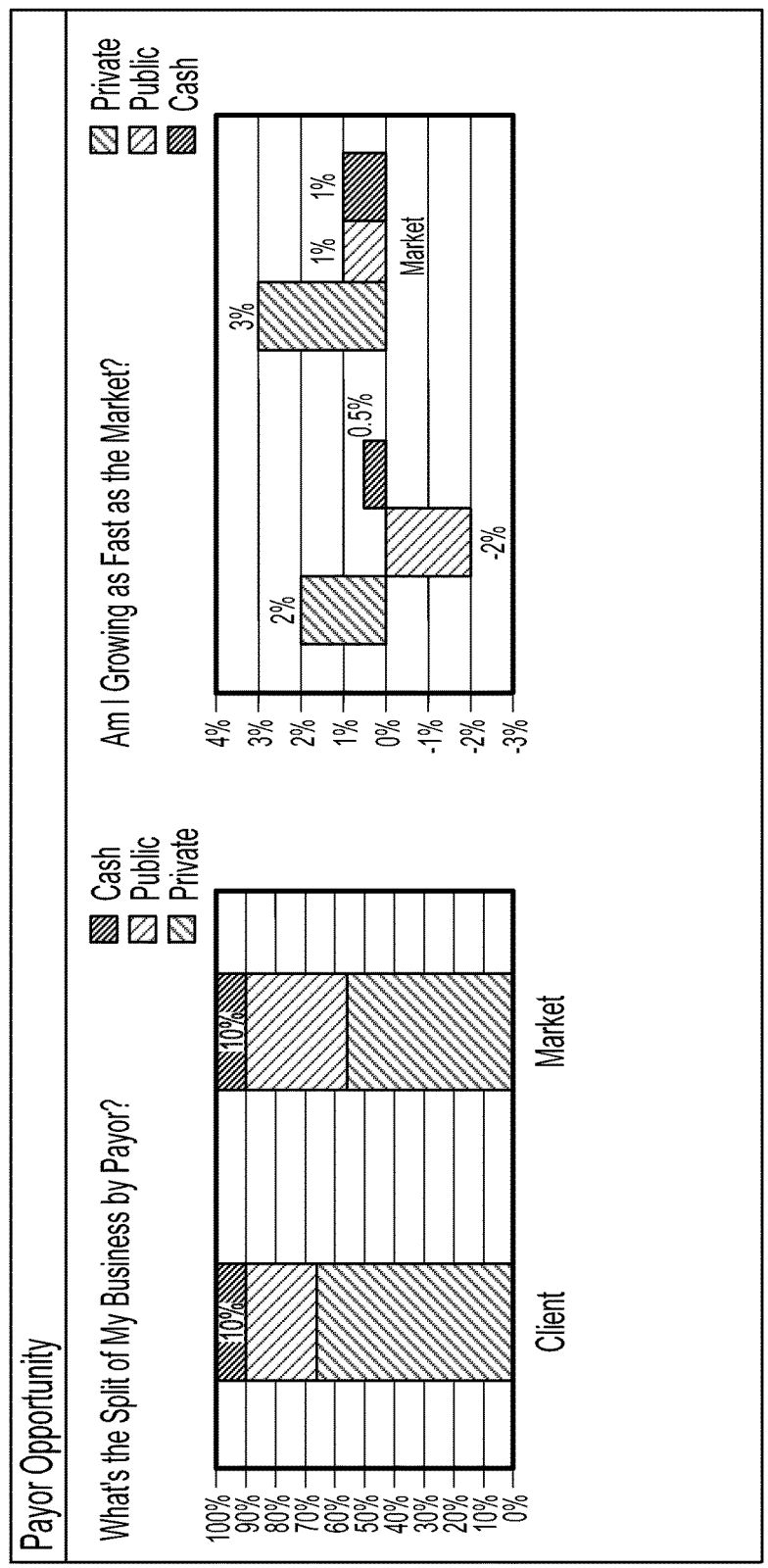
FIG. 9 illustrates one embodiment of a report generated in connection with the disclosed subject matter.

FIG. 9 illustrates a payor split report generated in connection with one embodiment of the disclosed subject matter. The payor split report may include any information associated with how the customers pay for the prescriptions. The purchases may be classified in three categories: public, which encompasses any purchase made using a public insurance plan; private, encompassing any purchase made using a private insurance plan; and cash.

FIG. 9 illustrates the percentages of the client's business based on payor type. FIG. 9 also illustrates the growth of business for each payor type for the client as compared to the market as a whole.

FIG. 10 illustrates one embodiment of a products/classes report that can be displayed to the user. A products/classes report may include any information related to particular classes or products. The product/classes report may be, for example, a top products/classes report which shows the products and classes with the best sales and/or growth. The products/classes report could also be a bottom products/classes report. A products/classes report may include total prescription count, dollar amount of prescriptions, market share of total prescription count and/or dollar amount of prescriptions (for the particular class or product) (also called My Share), and percent change for any of these values.

FIG. 10 identifies the top therapeutic classes and products at 1002 and the fastest growing therapeutic classes and products at 1004. The top products and classes may be selected based on the products or classes with the highest volume of total prescription count or dollar amount of prescriptions, depending on the metric to be used. The top products and classes may also be selected based on data related to the market as a whole. In other embodiments, the top products or classes may be selected based on client vs. classes of trade or client store vs. trade area. The fastest growing therapeutic classes and products may be determined based on those products or classes having the greatest growth based on the entire market. The provider may exclude from the calculation any product having a very small share of total prescriptions (e.g., <0.1%), as a small absolute change may result in a very large percentage change. The provider may also group the products by scientific name so that all generic, for example, can be counted as one.

Figure 11:
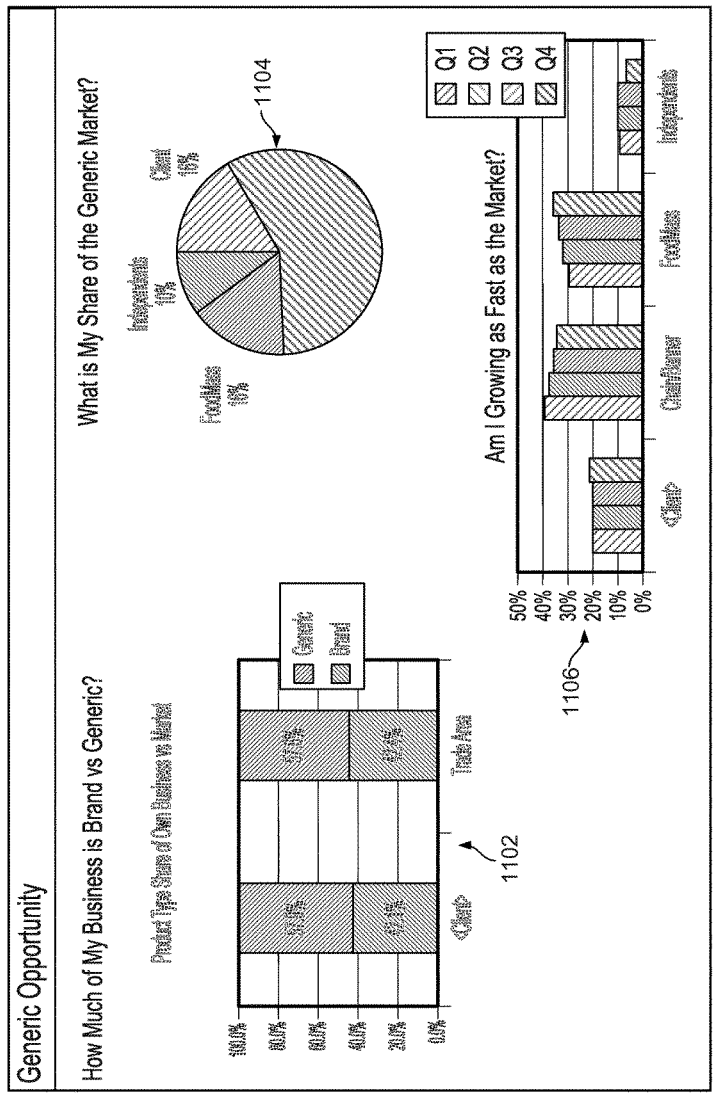
FIG. 11 illustrates one embodiment of a report generated in connection with the disclosed subject matter.

FIG. 11 illustrates one embodiment of a generic opportunity report that may be generated in connection with the disclosed subject matter. The generic opportunity report may include any information related to the sales of generic versus brand name products. The generic opportunity report may include the total prescription count and dollar amount for generic and/or brand products, and the associated market share.

The generic opportunity report includes a product type share chart 1102. Product type share chart 1102 illustrates the percentages of the client's business that is attributable to generic products versus brand name products. As with market share, product type share may be calculated based on total prescriptions filled by the client. In another embodiment, product type share may be calculated based on the cost of prescriptions filled by the client. Product type share chart 1102 may also include a representation of the product type share for the market as a whole. The market may be the entire international market, the entire national market, or any other market. The generic opportunity report also includes a generic market share chart 1104. The generic market share chart 1104 illustrates the client's market share of generic products (i.e., the percentage of the total number of generic products sold in the market that are sold by the client). In other embodiments, the generic opportunity report may also include a brand market share chart. The generic opportunity report may further include a generic growth chart 1106. The generic growth chart 1106 illustrates the growth rate of sales of generic products by the client as compared to the market as a whole. In other embodiments, the generic opportunity report may also include a brand growth chart.

Figure 12:
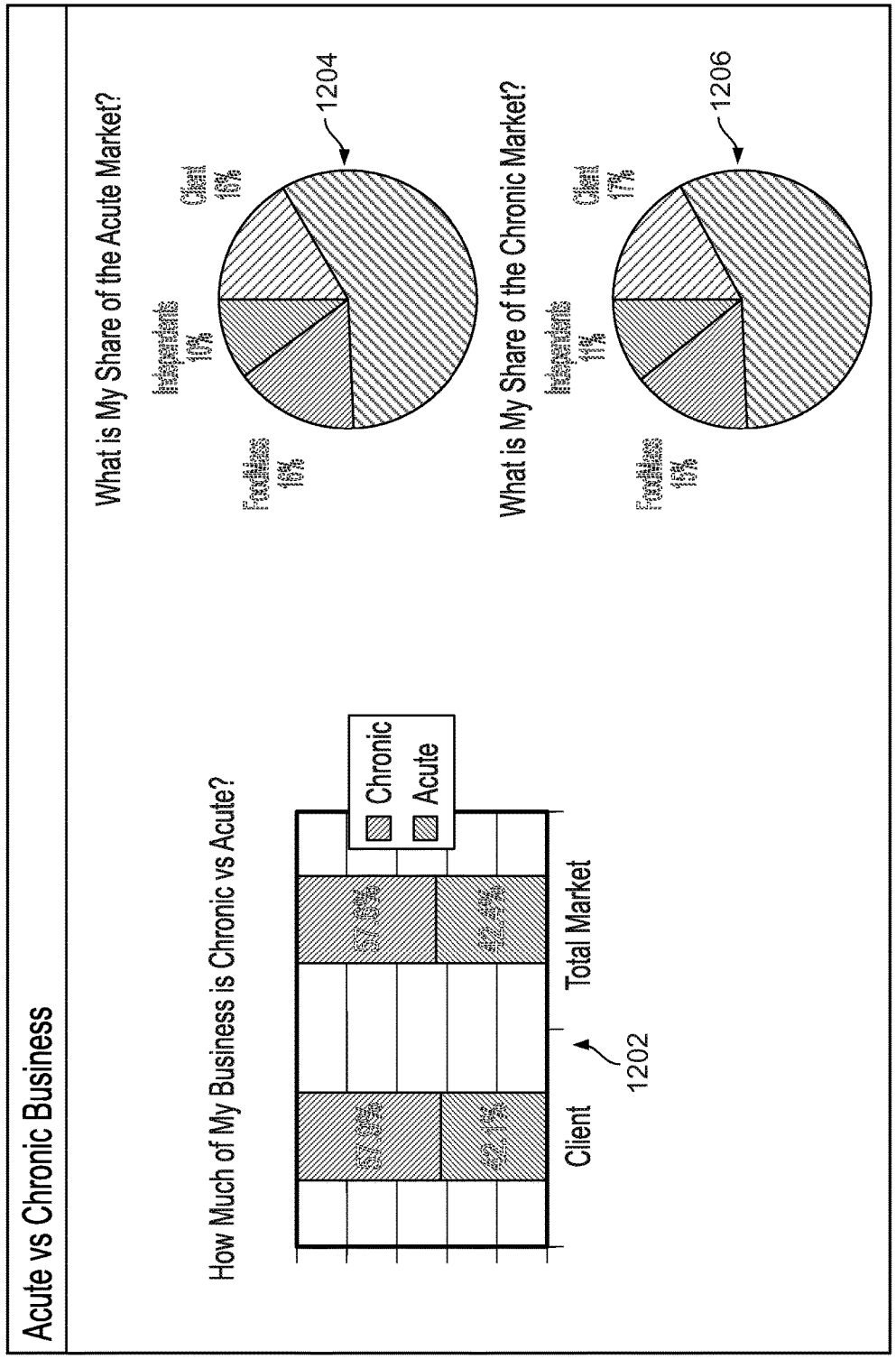
FIG. 12 illustrates one embodiment of a report generated in connection with the disclosed subject matter.

FIG. 12 illustrates one embodiment of an acute versus chronic business report that may be generated in connection with the disclosed subject matter. Each product is identified as one of an acute product or a chronic product. An acute product is a product that is used to treat diseases over a short time period, after which the purchaser will no longer need to continue using the product. A chronic product is a product that is used to treat diseases over a long period of time such that the purchaser is likely to become a repeat customer. Some products can be used to treat both acute and chronic diseases. In one embodiment, such products are determined to be either an acute product or a chronic product. In another embodiment, such products are not categorized and therefore are ignored for purposes of the acute versus chronic business report. In yet another embodiment, a certain share of the total sales and/or prescriptions for each of these combination products is allocated to acute products and chronic products based either on prescription information or the likelihood of use for a particular purpose. This information is generally stored with each product profile. The acute versus chronic business report may include any information related to the sales of acute products versus chronic products.

The acute versus chronic business report includes an acute versus chronic business share chart 1202 illustrating the percentage of the client's business which is attributable to acute products versus chronic products. The acute versus chronic business share chart 1202 may also include data regarding the share of the total market attributable to acute products versus chronic products. The acute versus chronic business report may also include an acute market share chart 1204 illustrating the percentage of total acute products in the market that are sold by the client. A chronic market share report may illustrate the same information for chronic products.

Figure 13:
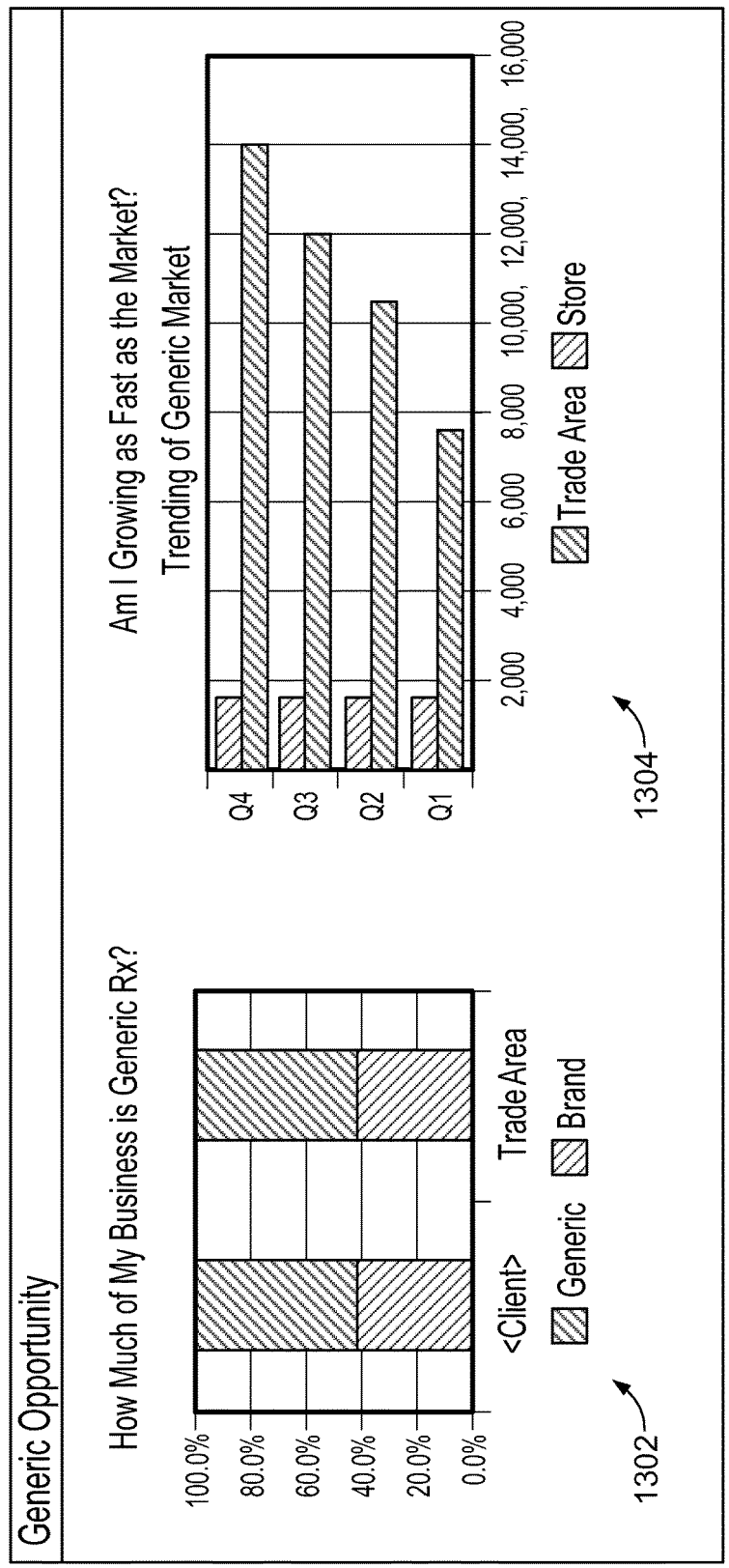
FIG. 13 illustrates one embodiment of a report generated in connection with the disclosed subject matter.

FIG. 13 illustrates an alternative embodiment of a generic opportunity report. The generic opportunity report in FIG. 13 is more specifically tailored for use in connection with a single store. Product type share chart 1302 is substantially similar to product type share chart 1102 in FIG. 11. However, while generic growth chart 1106 in FIG. 11 illustrates the growth rate of a client as compared to the market broken down by class of trade, generic growth chart 1304 illustrates the actual growth of an individual client store as compared to the trade area. The trade area may be defined as the set of client competitor stores linked to the client store.

Figure 14:
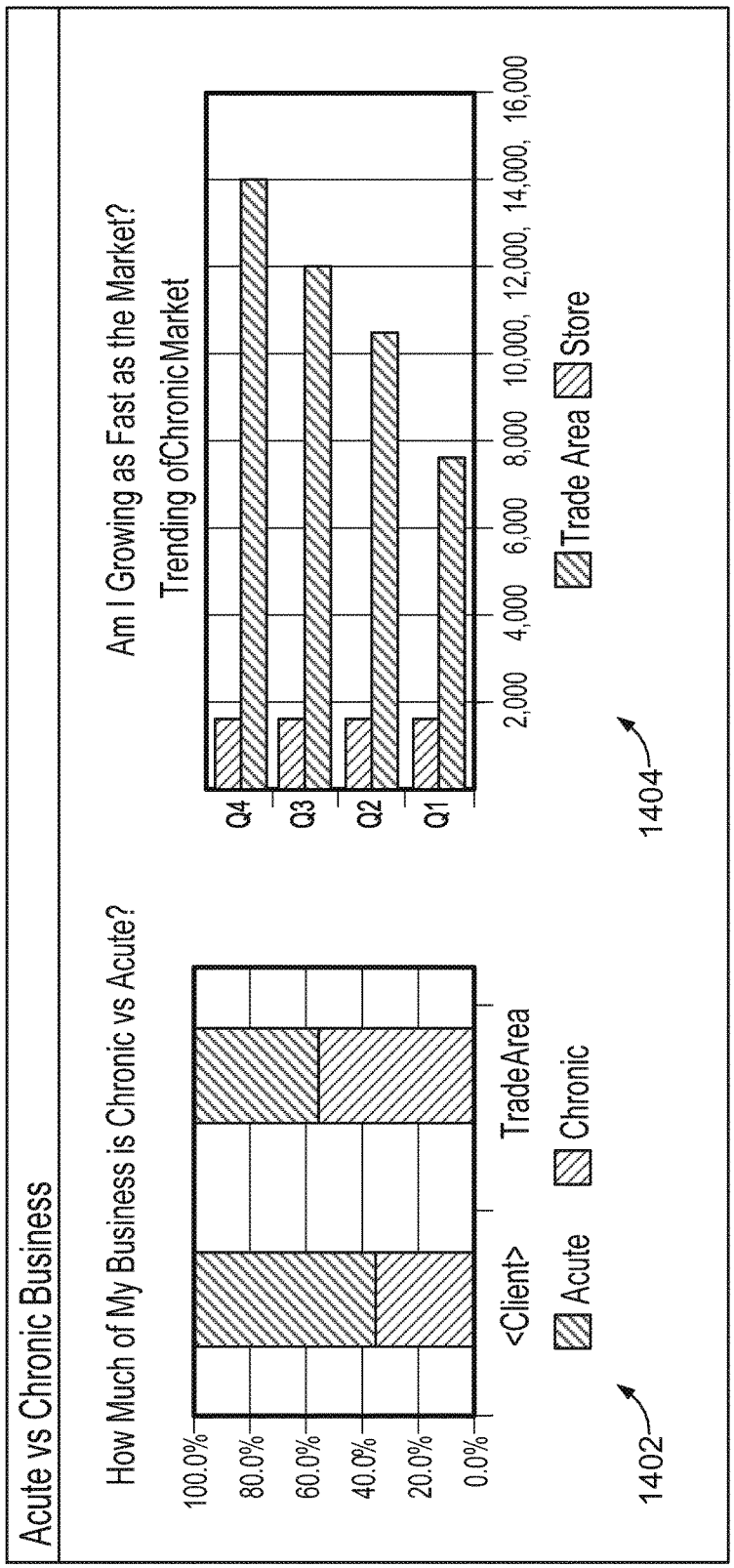
FIG. 14 illustrates one embodiment of a report generated in connection with the disclosed subject matter.

Similarly, FIG. 14 illustrates alternative embodiment of an acute versus chronic business report. Acute versus chronic business share chart 1402 is substantially similar to acute versus chronic business share chart 1202. Chronic growth chart 1304 illustrates the actual growth of the chronic product market for an individual client store as compared to the trade area. As shown by FIGS. 11-14, a wide range of metrics can be displayed for the various reports discussed herein. In one embodiment, FIGS. 11 and 12 show the reports for a user having a first configuration profile, while FIGS. 13 and 14 show the reports for a user associated with the same client having a second configuration profile.

Figure 15:
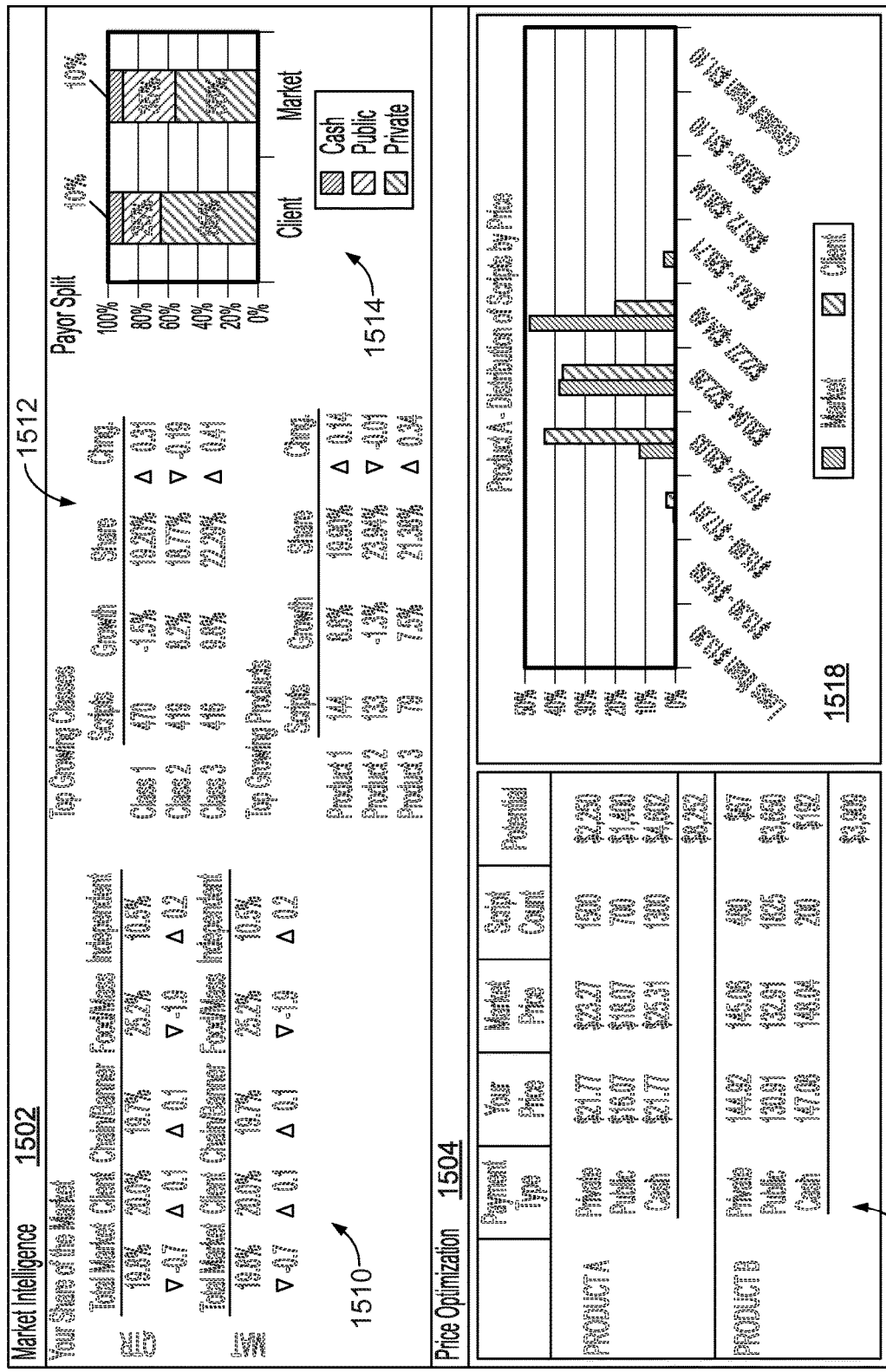
FIG. 15 illustrates one embodiment of a report generated in connection with the disclosed subject matter.
Figure 15:
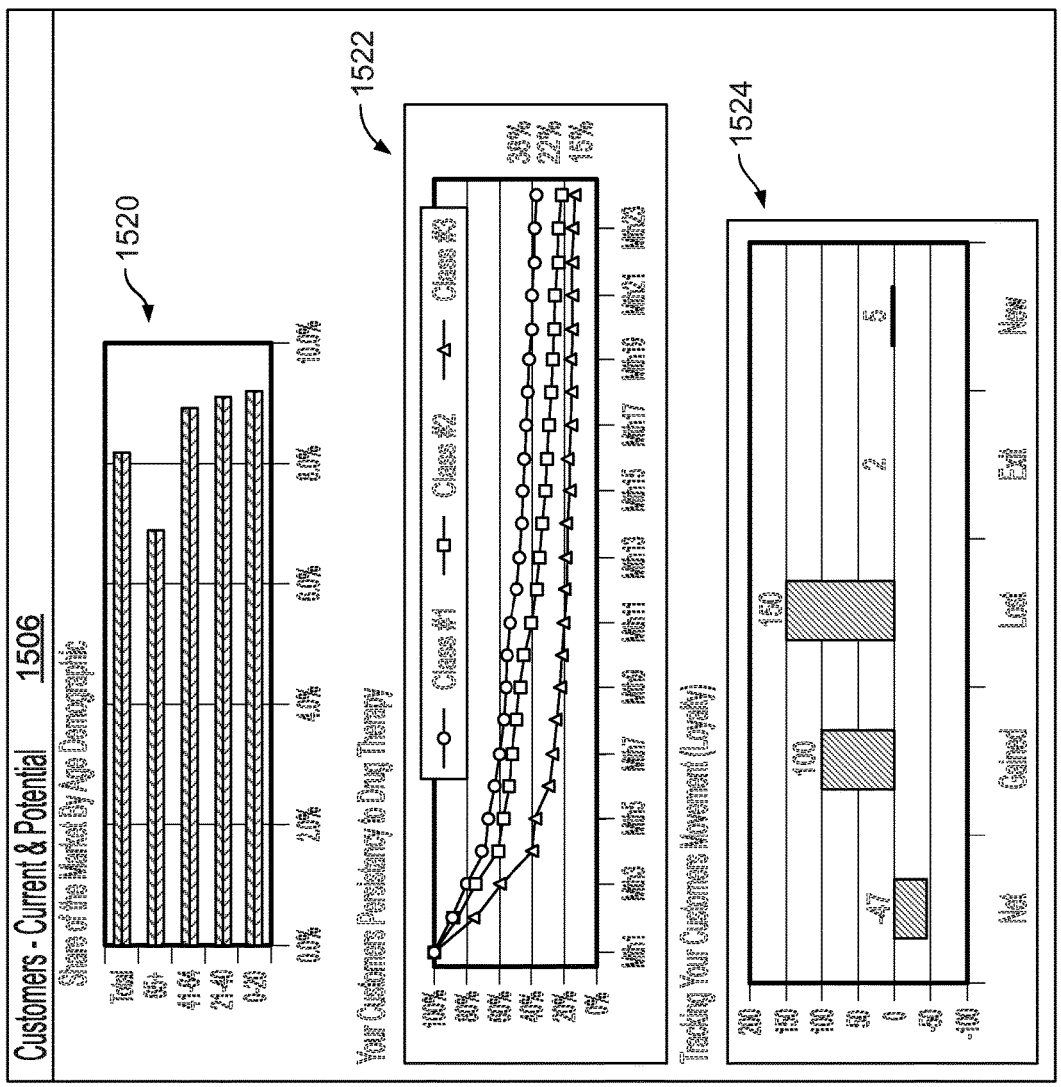
Figure 16:
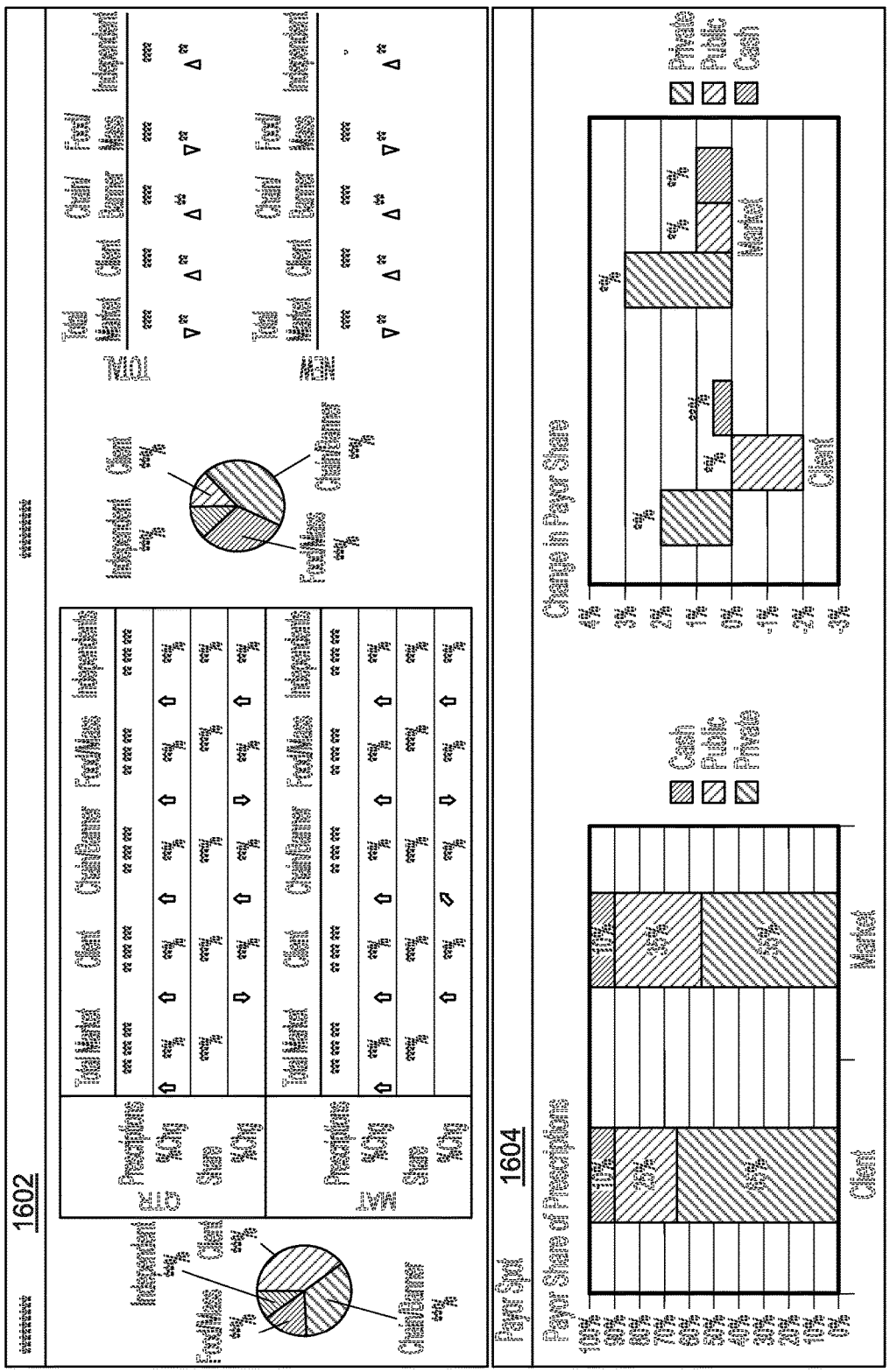
FIG. 16 illustrates one embodiment of a report generated in connection with the disclosed subject matter.
Figure 16:
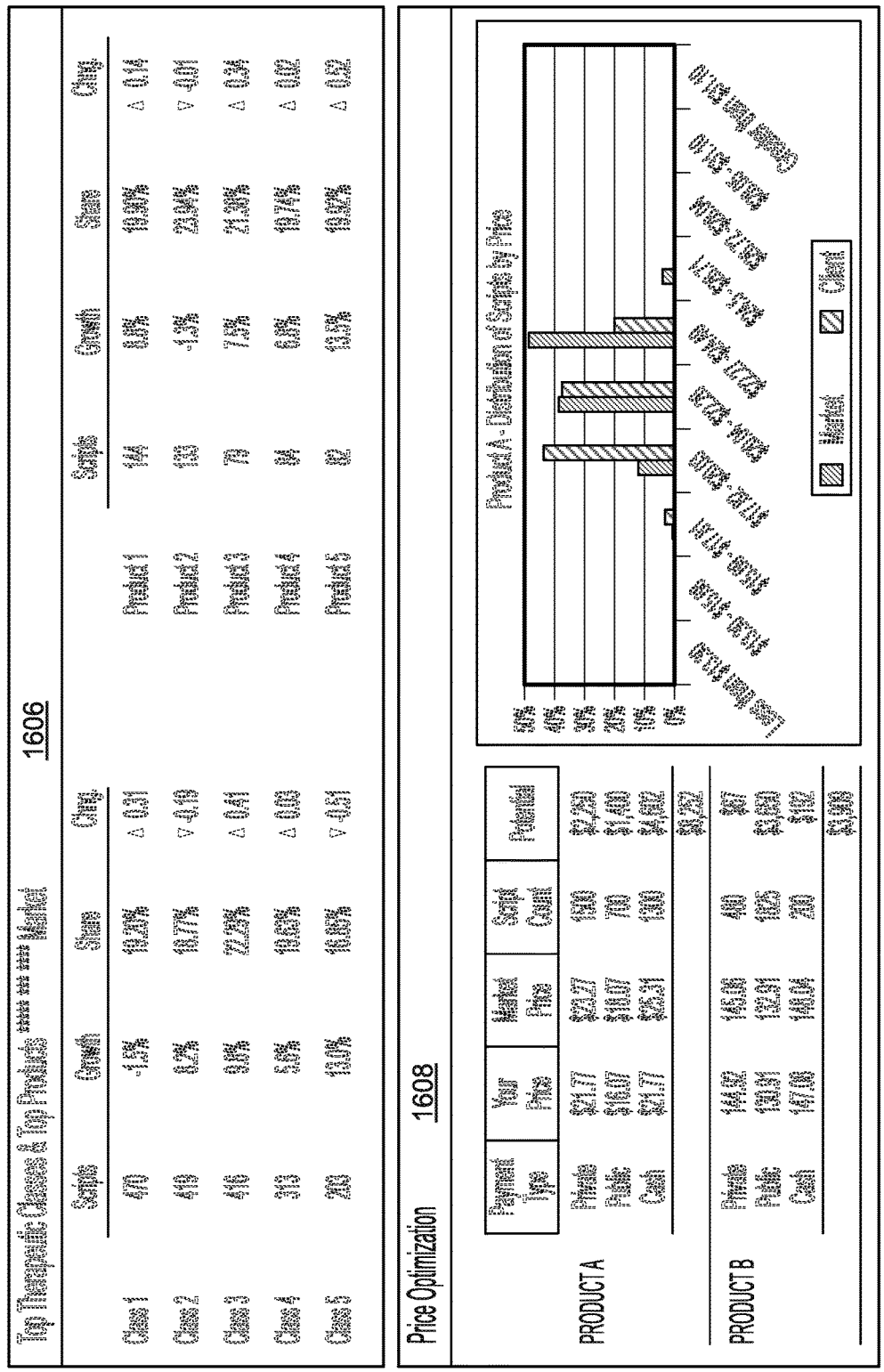

While each of the foregoing reports has been shown individually, the reports may also be displayed in a group as illustrated in FIG. 15. The report of FIG. 15 includes a Market Intelligence Report 1502, a Price Optimization Report 1504, a Customer-Current and Potential Report 1506, and a Physician Information Report 1508. As illustrated in Market Intelligence Report 1502, the various charts, graphs, and tables can be rearranged in various combinations. Indeed, Market Intelligence Report 1502 includes a market share table 1510 similar to market share table 704 in FIG. 7, a top growing classes and products table 1512 similar to the fastest growing classes and products table 1004 in FIG. 10, and a payor split chart 1514 similar to the payor split chart shown in FIG. 9. Any combination of charts, graphs, and tables described herein may be placed in a single report as desired by the provider and/or client.

Price Optimization Report 1504 provides data related to the pricing of various drugs by the client. Price Optimization Report 1504 may include a potential profits table 1516 which identifies products sold at less that market price and the potential profits that the client could reap if the price was changed to reflect the market price. Price Optimization Report 1504 may also include a distribution of scripts by price chart 1518 which illustrates the percentage of products sold by the client at each price range. The distribution of scripts by price chart 1518 may also include the same information for the market as a whole.

The Customer-Current and Potential Report 1506 provides a customer profile for the client and may identify potential opportunities in the client's customer profile. The report may include a market share by age demographic chart 1520 which illustrates the client's market share in each age group. The report may also include a customer persistency chart 1522 which illustrates how long the client's customers continue to purchase the same product upon first use. The report may further include a loyalty chart 1524 which illustrates how many customers a client has gained or lost during a certain time frame (e.g., in the past quarter).

The Physician Information report 1508 identifies the doctors whose prescriptions are filled at a client's pharmacy.

The Physician Information report 1508 may include a top prescribers chart 1526 indicating which doctors have the most prescriptions filled by the client's pharmacy. The top prescribers chart may be based on a number of metrics, including the total number of a physician's prescriptions filled at the client's pharmacy or the percentage of a physician's prescriptions filled at the client's pharmacy. The Physician Information report 1508 may also include a physician opportunity chart 1528 indicating which doctors have the fewest prescriptions filled by the client's pharmacy.

In some embodiments, the provider may offer each of the reports a la carte such that the client can select which reports to view. For example, Client A may select the reports shown in FIG. 15. Using the same system, Client B may select the reports shown in FIG. 16. Instead of viewing a Market Intelligence Report 1502, a Price Optimization Report 1504, a Customer-Current and Potential Report 1506, and a Physician Information Report 1508, Client B will, upon logging into the system, view a Market Share Report 1602, a Payor Split Report 1604, a Top Therapeutic Classes and Products Report 1606, and a Price Optimization Report 1608.

Figure 17:
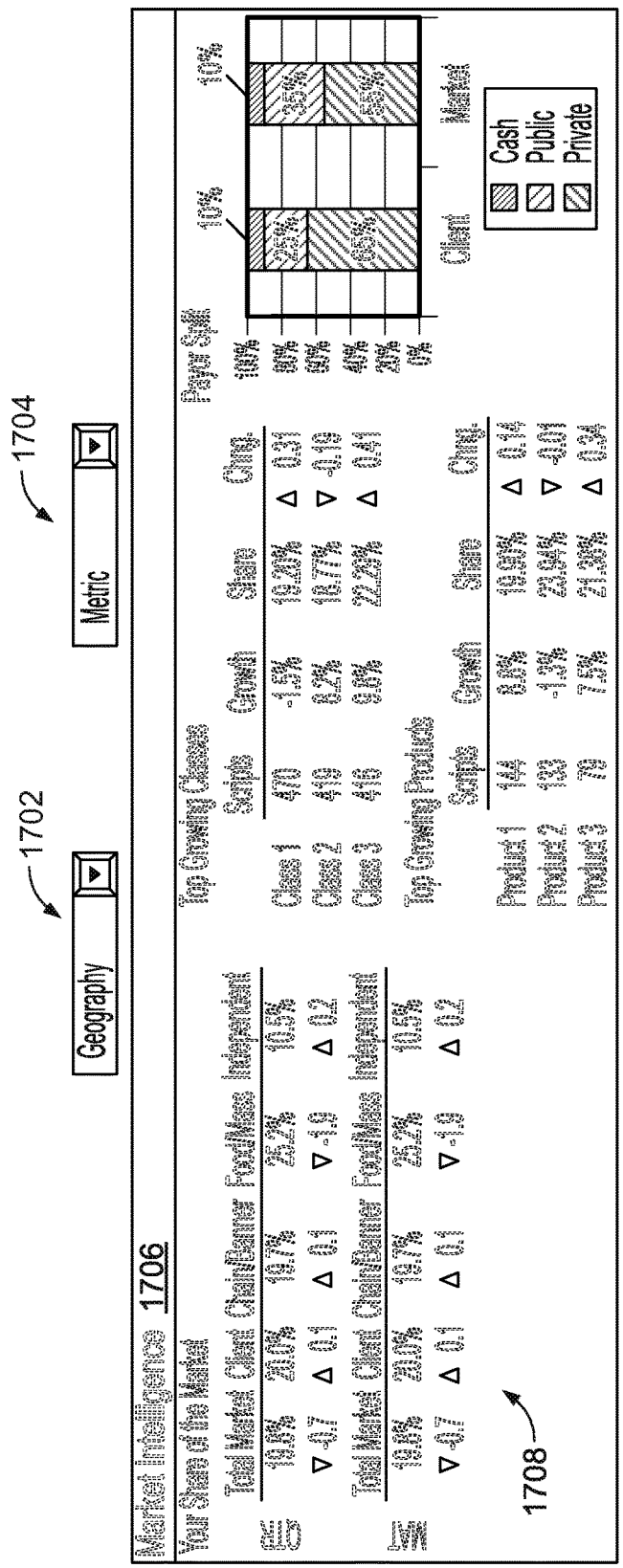
FIG. 17 illustrates one embodiment of a report generated in connection with the disclosed subject matter.
Figure 17:
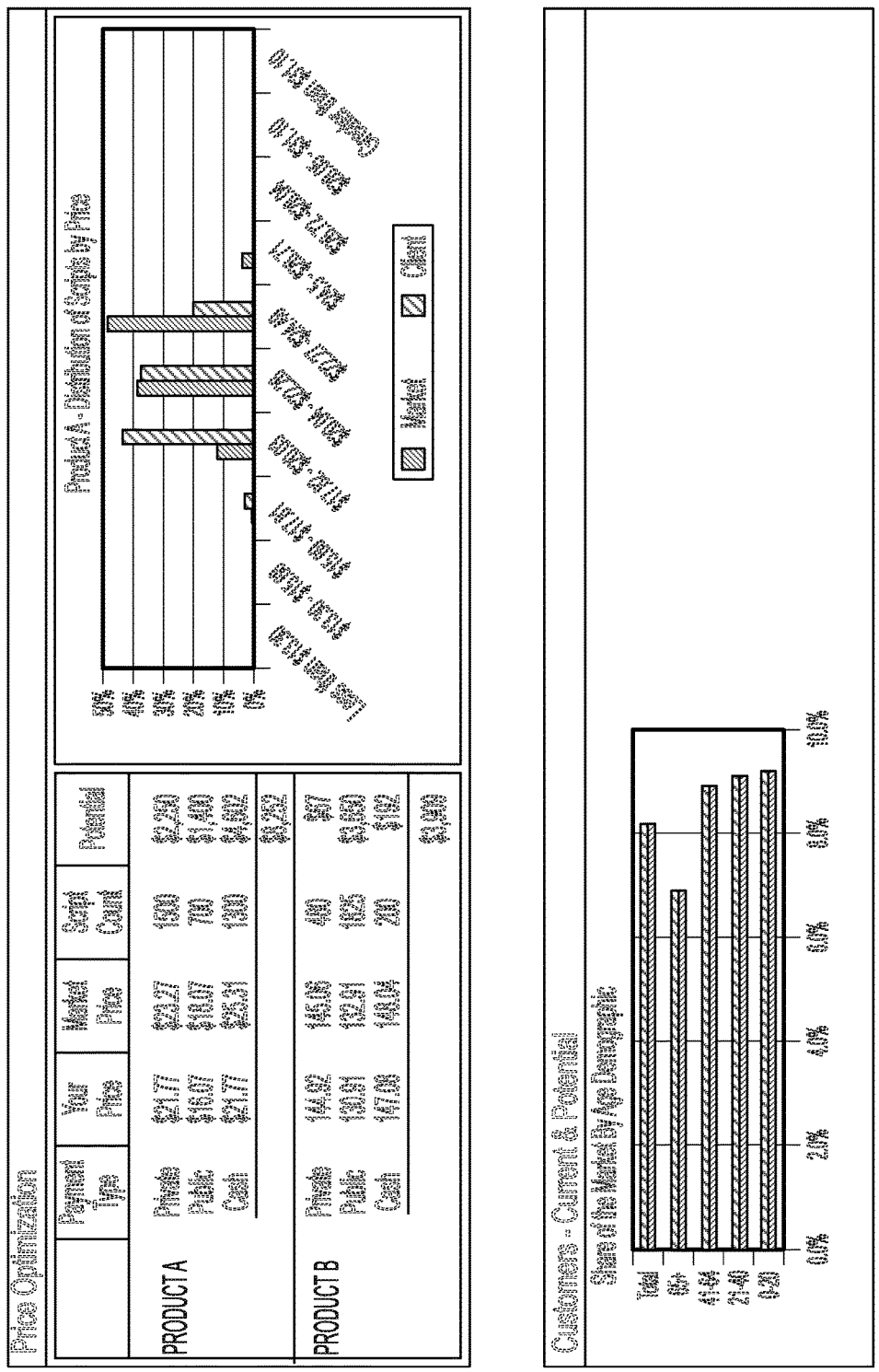

As previously noted, the user may have the option of viewing the reports with different filters. An example of a report providing the user with such filters is illustrated in FIG. 17. The report includes a geography dropdown box 1702 and a metric dropdown box 1704. The geography dropdown box allows the user to view the data for various markets. For example, in one embodiment, the user may begin by viewing the data for a single store, Store A. The user may use the geography dropdown box 1702 to select a different geographical view, such as a state. The data displayed to the user can be updated to show the data for the entire state. The user may also select a different client store (e.g., Store B) from the geography dropdown box 1702.

For example, the Market Intelligence Report 1706 includes a market share table 1708. When the user is viewing the data for Store A, the market share table shows Store A's share of the relevant local market. (As previously noted, the relevant local market for a given client store may be defined by the stores identified as client competitor stores for the client store). When the user selects the state configuration using the dropdown box 1702, the information in market share table 1708 may be dynamically updated to show the market share of the client in the state. The client's total prescriptions column of the market share table 1708 will reflect the total number of prescriptions filled by all client stores in the state during the relevant time period.

Metric dropdown box 1704 similarly allows the user to select the metric for calculating the relevant data. For example, in one embodiment the user may select either total prescriptions or prescription cost from the metric dropdown box. If total prescriptions is selected, the data in market share chart 1708 will be calculated based on the number of prescriptions filled by the client. If prescription cost is selected, the data in market share chart 1708 will be calculated based on the total cost of the prescriptions filled by the client.

Figure 18:
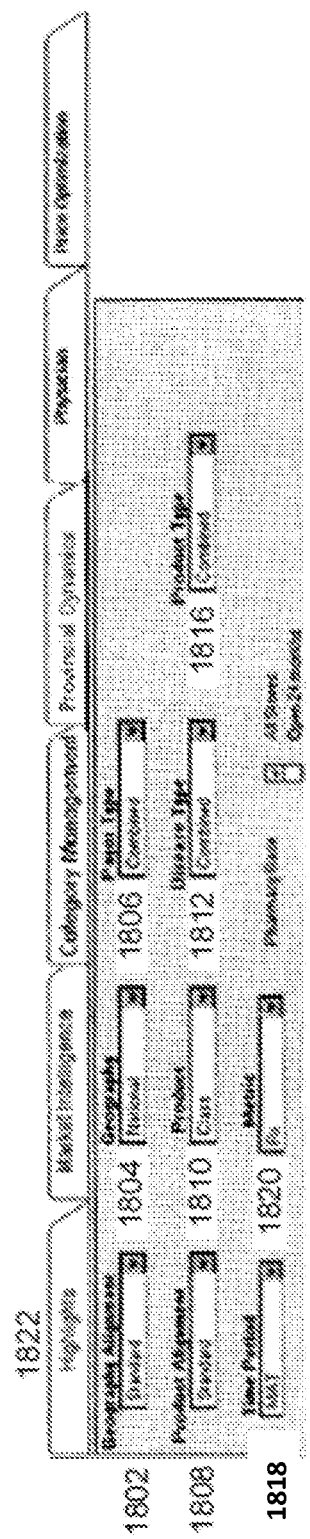
FIG. 18 illustrates filters that can be used in connection with one embodiment of the disclosed subject matter.

FIG. 18 illustrates another embodiment of the disclosed subject matter in which filters are made available to the user. Geography hierarchy dropdown box 1802 allows the user to select a geographic hierarchy to use. Available geographic hierarchies may include a standard geographic hierarchy (i.e., a geographic hierarchy made available to all users) and a configured geographic hierarchy (i.e., a geographic hierarchy configured to the client's specifications). In some embodiments, multiple standard and/or configured geographic hierarchies may be made available to the user. Based on the selected geographic hierarchy, the user may select a particular geographical view from the geography dropdown box 1804. For example, FIG. 19 illustrates one embodiment of a standard geographical hierarchy 1902 and a configured geographical hierarchy 1904. If the user wants to view the data for the client at the national level, the user may select either standard or configured from the geography hierarchy dropdown box 1802, and select national from the geography dropdown box 1804. However, if the user would like to view the data for stores managed by a particular senior director, the user can select configured from the geography hierarchy dropdown box 1802, and select senior director from the geography dropdown box 1804. This will allow the user to compare all client stores managed by the senior director against all other competitor stores in the relevant market.

Payor Type dropdown box 1806 allows the user to view data for a particular payor type. The user may select between public, private, cash, or combined. For example, if the user selects cash, the data presented to the user will be for all prescriptions filled by the client in which the purchaser paid in cash.

Product hierarchy dropdown box 1808 is similar to geography hierarchy dropdown box 1802, except that it allows the user to select a hierarchy for the product. The user may select between, for example, standard and configured. Product dropdown box 1810 allows the user to view data for a particular product. This filter may appear, for example, in a tree format, such that when the cursor is placed over a particular product level, a list opens to allow for selection of a particular product in that class. For example, if class is indicated, a list should open to allow the user to select a particular class (e.g., Cardiovascular Drugs).

Disease type dropdown box 1812 allows the user to view data for a particular disease type. In particular, this dropdown box may allow the user to select between acute, chronic, or total. For example, if the user selects chronic, the data presented to the user will be for all prescriptions filled by the client for products associated with chronic diseases.

Product type dropdown box 1814 allows the user to view data for a particular product type. In particular, this dropdown box may allow the user to select between generic, brand, or total. For example, if the user selects generic, the data presented to the user will be for all prescriptions filled by the client for generic products.

Time period dropdown box 1816 allows the user to view data for a particular time period. This dropdown box may allow the user to select between monthly, quarterly, and MAT. In another embodiment, the user may be able to select one of last month, last quarter, last six months, and last two years, among other possible time periods. For example, if the user selects last six months, the data presented to the user will be for all prescriptions filled by the client in the last six months.

Metric dropdown box 1820 allows the user to select the metric by which the data will be calculated. The functions of metric dropdown box 1820 were explained above in relation to metric dropdown box 1704 of FIG. 17.

FIG. 18 also illustrates a tab system that can be used in connection with some embodiments of the disclosed subject matter. The report displayed to the user may have several different parts which are associated with the different tabs. For example, each of the reports described herein may be displayed on a separate tab. In one embodiment, the user is directed to a highlights tab 1822 upon logging in. The highlights tab may include certain key performance indicators (KPIs). For example, one KPI may be a comparison of the client's current market share based on the most recent MAT versus the same MAT from the year prior, along with a growth figure. Another KPI may be the client's growth versus the collective market share growth for all other classes of trade for the most recent MAT versus the same MAT from the year prior. Another KPI may be the client's current market share. The highlights tab 1822 may also include a map showing the growth rate in each subsection of a given geographical grouping. For example, if the national filter is selected, the growth in each province, state, or territory may be shown.

Figure 20:
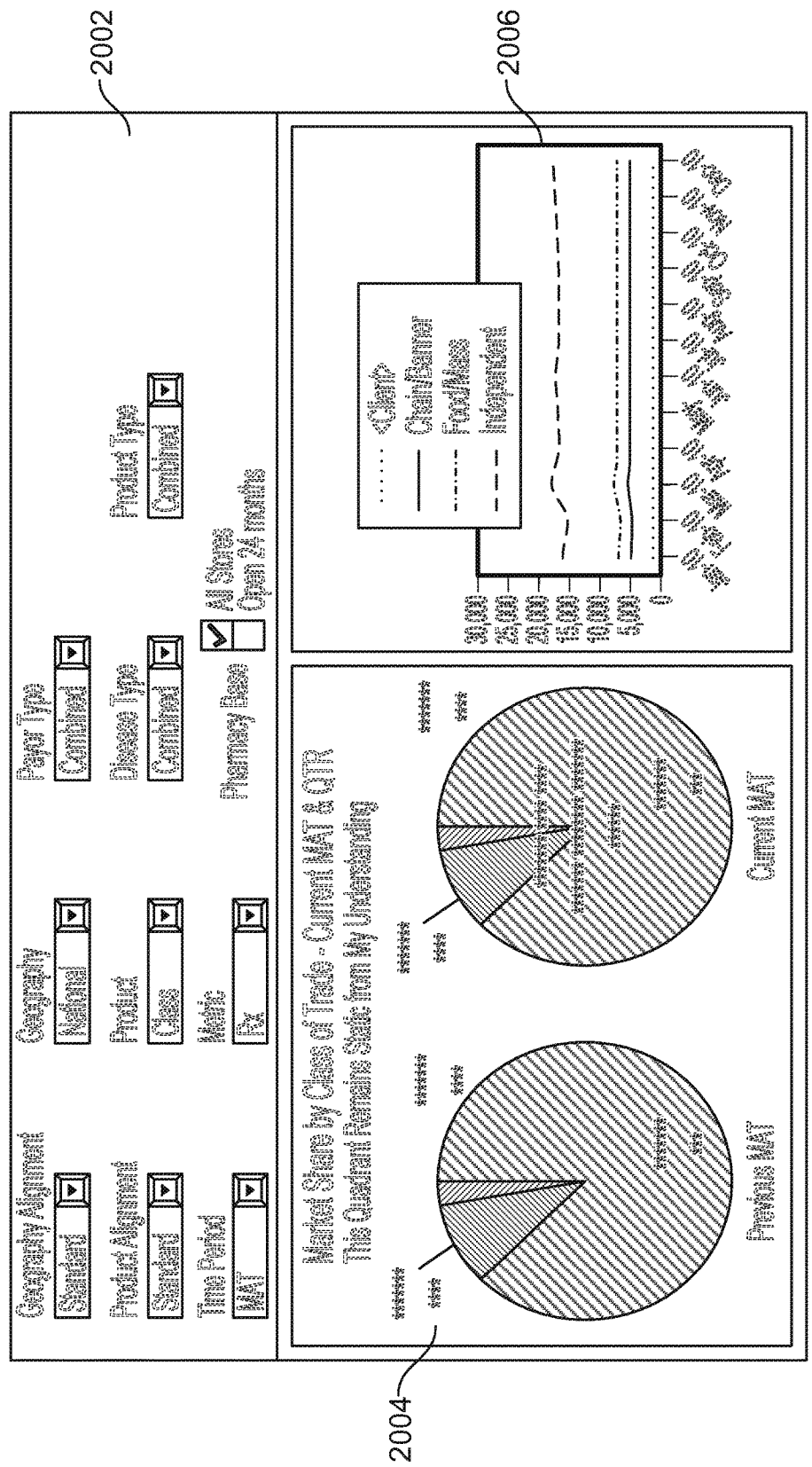
FIG. 20 illustrates one embodiment of a report generated in connection with the disclosed subject matter.
Figure 20:
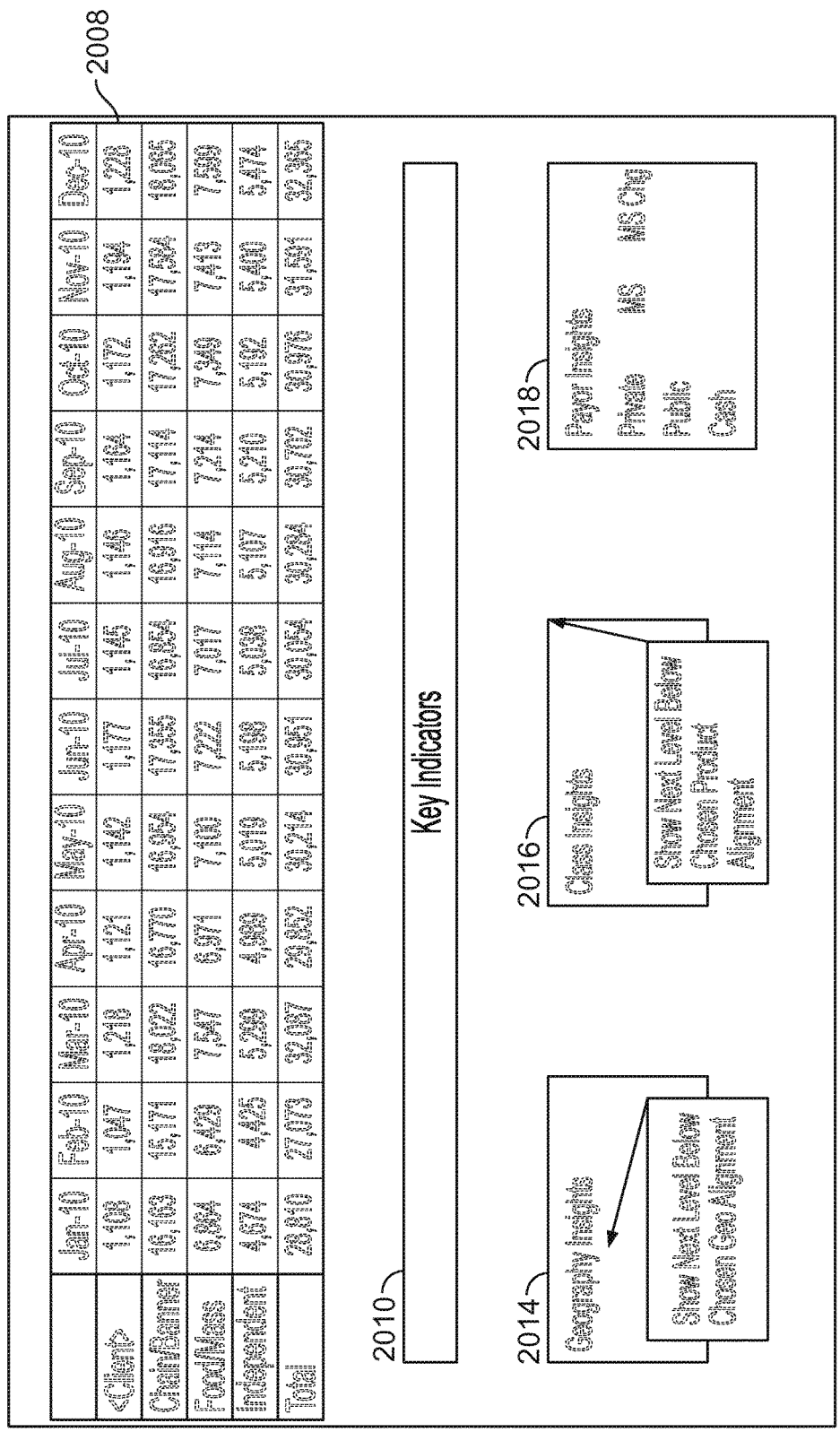

One embodiment of a market intelligence report using the filters is illustrated in FIG. 20. The filters described with reference to FIG. 18 are shown in the header 2002. The market intelligence report includes a market share chart 2004, a market share trend graph 2006, an historical performance table 2008, and a key indicators toolbar 2010. The various charts, graphs, tables, and toolbars may be dynamically adjusted by using the dropdown boxes in header 2002. The historical performance table 2008 may list the data used to compile the market share trend graph 2006.

Key indicators toolbar 2010 includes geography insights, class insights, and payor insights 2018. Geography insights may include any information related to a subset of the selected geographic region. Geography insights 2012 may list the fastest three growing geographies at a particular geographic level. The fastest growing geographies are selected based on the change in prescription count between periods. The data values shown may include market share and share change. However, other metrics and data values may also be utilized. The geographic level may be one level below the current level selected. For example, with reference to FIG. 19, and assuming standard hierarchy 1902 is being utilized, the three fastest growing regions will be identified in geography insights 2014 if the geography dropdown box is set to national. If the geography dropdown box is set to CMA, on the other hand, the three fastest growing districts will be identified in geography insights 2014.

Class insights may include any information related to the products sold in the selected geographic region. Class insights 2016 may illustrate the market share and market share change by product type for the selected geography. The product type may be one level below the current level selected. For example, if class is selected in the product dropdown box, the class insights will show the market share and market share changes for various subclasses. Payor insights may include any information related to payor type in the selected geographic region. For example, payor insights 2018 may illustrate the breakdown of market share and market share change by payer type.

Although the filters described in relation to FIGS. 17-20 allow the user to select the data that is displayed, in another embodiment the user may be required to follow a pre-defined path. For example, a market share report for a particular store may be displayed to the user upon initial log-in. By clicking a NEXT button, the user may then view a generic opportunity report for that particular store. The user may continue to click the next button to be guided through a series of reports. The reports shown in each such series may be determined by the provider. The determination may based on information stored in the database, product research to define a series that users find helpful, or any other method. For example, a user may be guided through a series of price optimization reports for products that are under-priced (relative to the market) for a particular store. Alternatively, the user may be guided through a series of reports corresponding to the reports purchased by the client.

Figure 21:
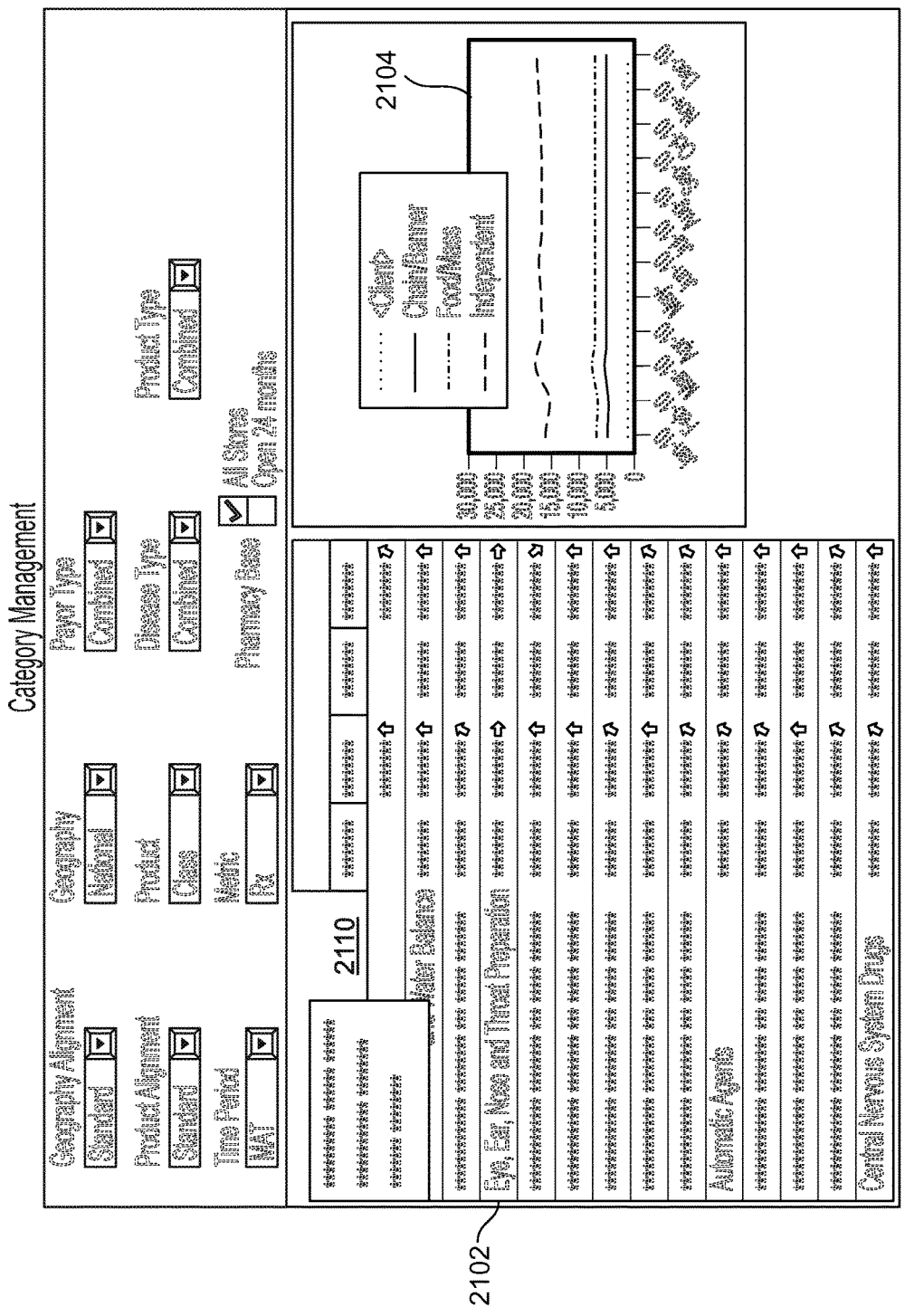
FIG. 21 illustrates one embodiment of a report generated in connection with the disclosed subject matter.
Figure 21:
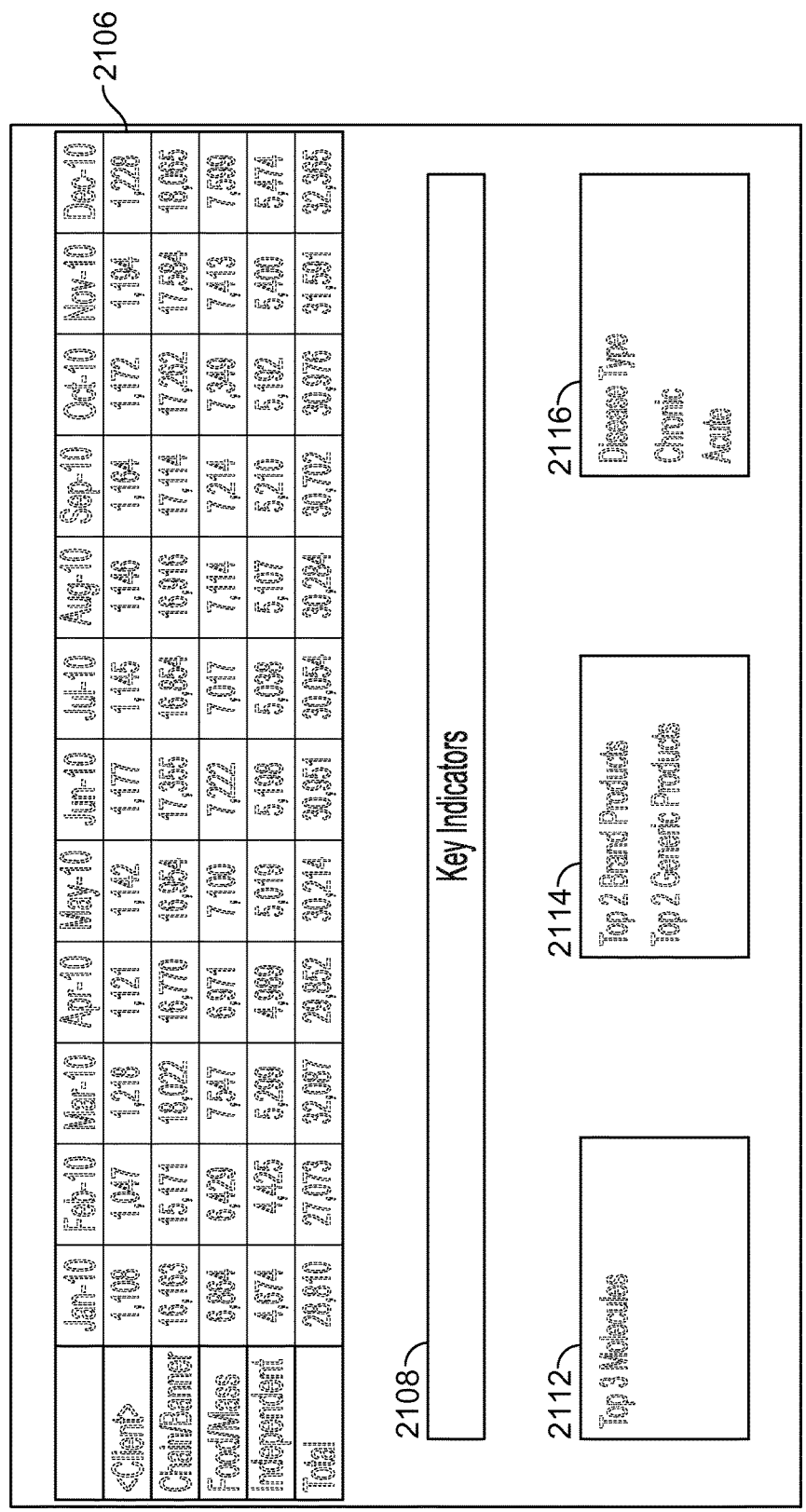

FIG. 21 illustrates a category management report generated in connection with one embodiment of the disclosed subject matter. The report includes a scorecard 2102, a market share trend graph 2104, an historical performance table 2106, and a key indicators toolbar 2108.

Scorecard includes a column 2110 which lists the class of products. The scorecard 2102 may interactive, such that the user can click on any of the classes in column 2110 and the market share trend graph 2104 and the historical performance table 2106 may dynamically adjust to reflect data related to the selected class. Scorecard 2102 may include the client's volume of prescription count or dollar amount, growth percentage, market share, and market share change for each therapeutic class. The information may be shown for a different product level depending on the user's selections.

The key indicators toolbar 2108 includes a top three molecules box 2112, a top branded/generic box 2114, and a disease type breakdown box 2116. The top three molecules box may list the top three products for the product level immediately below the selected product level. For example, if the user has selected a class from the product dropdown box, the top three molecules box 2112 will list the top three subclasses within the selected class. The top branded/generic box will list the top branded and generic products (e.g., two of each) for the product level immediately below the selected product level. For example, if the user has selected a class, the top branded/generic box will list the top branded and generic products within that class. The disease type breakdown box may list, for the selected geographic level, the market share and market share change by disease type for that geographic group.

Figure 22:
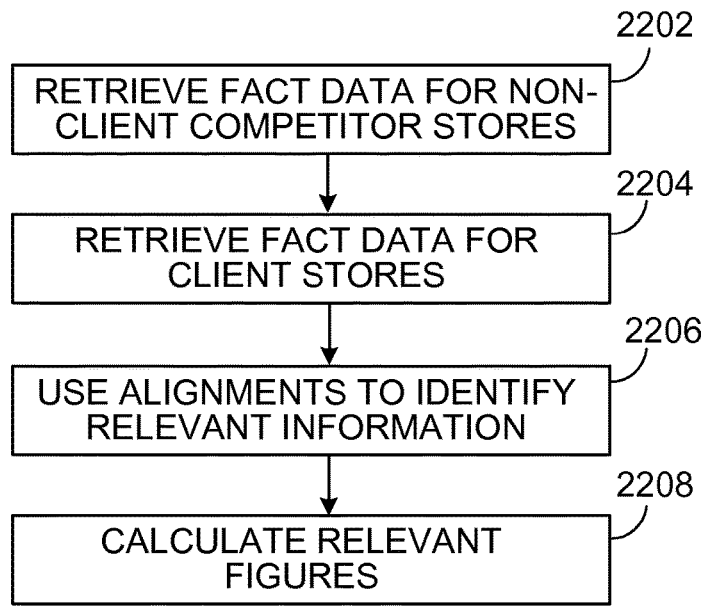
FIG. 22 is a flow chart describing how a report can be generated in connection with one embodiment of the disclosed subject matter.

An embodiment of the process for generating a market intelligence report is illustrated in FIG. 22. At 2202, the provider retrieves fact data associated with the non-client competitor stores. The fact data may be pulled from the database. In one embodiment, the information to be retrieved is stored by GPM.

The provider next retrieves fact data for the client stores at 2204. This fact data may also be pulled from the database, which may include GPM.

The provider then uses the alignments to identify which information is relevant at 2206. This is done by only using the information which matches the filters set by the user. If no filters are used, all fact data from all stores will be used in creating the report. However, if one or more filters are used, only a subset of the fact data will be used in creating the report. For example, if the PROV filter is set for a store located in Winnipeg, Manitoba, only fact data from stores having Manitoba in the PROV field of the geographical alignment will be used in creating the report. Similarly, if the user has selected generic in the product type filter, only fact data associated with sales of products labeled as generic in the GENERIC INDICATOR field of the product alignment will be used in creating the report. Those having ordinary skill in the art will understand that any combination of data fields may be similarly used to identify the fact data that should be used in generating the report.

After the provider has identified the fact data that is to be used in creating the report, the provider uses the fact data to calculate the relevant figures at 2208. The figures that the provider calculates will depend on what information is to be displayed to the user. For example, in order to create the market share chart 702 in FIG. 7, the provider calculates the size of the entire market. For example, if the number of prescriptions metric has been selected, the provider sums the total number of prescriptions for all stores and products that have been identified as relevant in 2206 to obtain a market total. The provider also sums the total number of prescriptions for all stores and products that have been identified as relevant in 2206 and which are labeled a CLIENT in the CLASS OF TRADE data field to obtain a client total. The provider can divide the client total by the market total to obtain the client market share. The provider may also perform similar calculations to obtain the market share for non-client stores in each of the FOOD/MASS, CHAIN/BANNER, and INDEPENDENT classes of trade. Those having ordinary skill in the art will understand that each of the charts, tables, and graphs presented herein, as well as any similar data reflecting business metrics that are generally known in the art, may be calculated in a similar manner.

The outlet count report may be calculated in a different manner. The generation of an outlet count report starts with the creation of an output table. The output table reflects the status of each store in the database (or the geographical alignment) for each of the previous 24 months. The output table will reflect that the store was open for each date that is after the ADDED DATE in the geographical alignment but is before the DROPPED DATE. The outlet count report is generated by counting the number of stores open as of the relevant date. Similarly, the disclosed subject matter may allow the user to choose between organic and non-organic data. Organic data, as used herein, refers to data from any store that has been opened for at least 24 months. Thus, if organic data is selected, only data from stores that have been opened for at least 24 months, as indicated in the OPEN_MONTHS data field of the geographical alignment, will be identified as relevant for generating the report.

With reference to FIG. 1, the alignments are updated based on new data at 110. The updates may be performed periodically (e.g., at the end of every month or every quarter). The previous alignments may be saved to the archives. The locations of any competitor stores may be updated. If a store has moved, for example, the new address will have to be saved. Updated alignment files can be created for each client. In one embodiment, updated files are created for each client based on the client's subscription. For example, if client A has a monthly subscription, and client B has a quarterly subscription, client A's alignment files will be updated more frequently than client B's alignment files. The reports generated for each of the clients may also be based on the subscription, such that client A's reports are updated monthly. Finally, upon updating the alignments, a notification may be delivered to each client and/or user regarding the new information.

Figure 23:
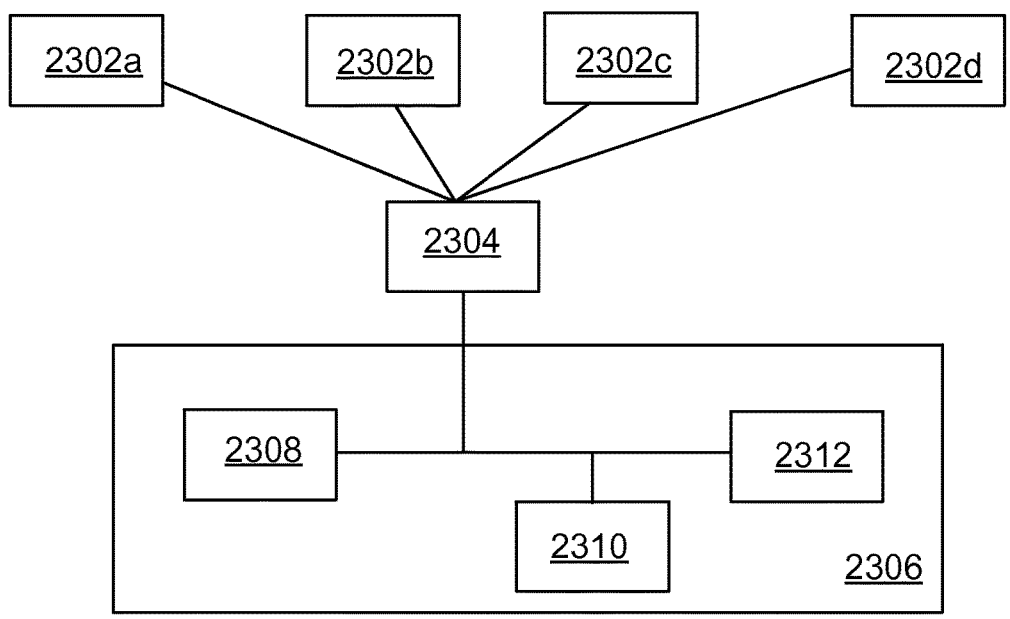
FIG. 23 illustrates one embodiment of the hardware that may be used in connection with the disclosed subject matter.

FIG. 23 illustrates one embodiment of the system used to access the portal of the disclosed subject matter. User computers 2302a, 2302b, 2302c, and 2302d are communicably connected to a user interface 2304. User computers 2302 can be any computing device known in the art, including personal computers, PDAs, smartphones, and the like. User computers 2302 are connected to the user interface 2304 through a data network. The data network may be, for example, the Internet. The data network may also be a client's Intranet. However, any data network can be used without departing from the scope of the disclosed subject matter. The user interface 2304 may be a website which a user access by entering the appropriate website address. However, the user interface may include any device that allows the user to establish a connection with the portal. As previously discussed, the user interface in some embodiments of the disclosed subject matter may be a terminal provided by the provider, in which case user computers 2302 may not be necessary. The user interface 2302 provides a connection between the user computers 2302 and the portal server 2306. The portal server 2306 may include a database 2308 for storing data. The database 2308 may store, for example, fact data related to various products and locations (such as data gathered in commercial databases, data compiled from publicly available sources, data received directly from some or all retail pharmacies, or data provided by the client), store or product profiles, and various alignment files. The database 2308 may also store client data including user names, associated permissions, and configured hierarchies. In general, any data used by the portal can be stored in database 2308. Database 2308 may be a single memory device. In other embodiments, however, database 2308 can be formed by a plurality of memory devices. The server portal 2308 can also include a report generator 2310 for generating reports to be presented to the user and an alignment module 2312 for constructing alignments to be used in connection with the disclosed subject matter. The portal server 2306 may be a computer system in which discrete machines are communicably connected. In other embodiments, however, various components of the portal server 2306 may be modules of a single machine. For example, report generator 2310 and alignment module 2312 may be realized using a single machine. User interface 2304 may likewise be a part of or separate from portal server 2306. The portal server 2306 and other hardware components can provide functionality as a result of logic hardwired or otherwise embodied in a circuit, which can operate in place of or together with software to execute particular processes or particular parts of particular processes described herein. Reference to software can encompass logic, and vice versa, where appropriate. Portal server 2306 or other hardware components may also be realized using computer-readable media. Reference to a computer-readable non-transitory storage medium can encompass, for example, a storage device, a memory, a circuit (such as an integrated circuit (IC)) storing software for execution, or a circuit embodying logic for execution, where appropriate. The present disclosure encompasses any suitable combination of hardware and software.

As noted earlier, the provider may offer a plurality of levels or tiers of access to the portal, and the information and analysis available to a client through the portal may vary depending on the client's level of access. In one implementation, at a Tier 1 level of access, reports generated for the client and provided through the portal may include information and analysis at a high level. The reports may, for example, provide the client with quantified market intelligence that can be used by the client to answer key questions related to conditions in the relevant market, or to the client's business. At a Tier 2 level of access, generated reports may include more advanced information and analysis, and additional interactive features may be provided. For example, in one implementation, a client with a Tier 2 level of access may be provided with guided analytics, and with the ability to select a plurality of metrics. Clients having a Tier 3 level of access to the portal may be provided with unique business applications that can be used to generate reports providing detailed information relating to particular topics. For example, in one implementation, applications available through the portal to a client with a Tier 3 level of access may be used to generate a specific type of advanced report that includes indicators relating to one or more critical measurement areas.

Although examples of reports, modules, and applications that are available for each of three levels of access are provided below, it should be understood that a portal provider may offer fewer or more levels of access to its clients than those described herein, and that the particular reports, modules, and applications associated with a given level of access may vary between implementations. In some implementations, each progressive tier of access may offer additional insight and analytical complexity to a client, as well as additional functionality or interactivity, as compared to the last.

A retail client may be interested in obtaining store-level benchmarking and key performance and market indicators that facilitate business planning. Reports generated for a retail client having a Tier 1 level of access may include, for example, indicators that assist the client in determining (1) the client's share of the relevant market; (2) a rate at which the client's business is growing, and a comparison of that rate against the market or one or more specific competitors; (3) potential for growth in a particular area of trade; (4) which products or classes of products are top sellers; or (5) which products or classes of products are experiencing the fastest rate of growth.

Reports may be tailored to the relevant market. Where the relevant market is the retail pharmaceutical market, for example, reports generated for a retail client having a Tier 1 level of access may include indicators that assist the client in determining (1) a proportion of the client's business that involves the sale of pharmaceuticals used to treat acute as opposed to chronic conditions; (2) a proportion of the client's business that involves the sale of brand as opposed to generic pharmaceuticals; (3) how the client's payor split, between public, private, and cash payors, compares to the market; (4) payor trends; or (5) high potential prescribing stores.

Reports may also be generated for clients other than retail clients. Taking the pharmaceutical market as an example, a government may be interested in determining how to deliver affordable healthcare to its citizens, and in determining how to drive costs associated with pharmaceuticals down. The portal may be configured to generate reports for a government client that include indicators that assist the client in determining market conditions within a geographic area, and in determining the effectiveness of services delivered or paid for by the client, so as to better achieve these and other goals. Similarly, private insurers may be interested in analyzing market conditions and in driving costs down, and the portal may be configured to generate reports for an insurance client that include indicators that assist the client in determining how to achieve its particular goals.

As noted above, a client having a Tier 2 level of access to the portal may benefit from advanced analytic tools, as well as additional interactive features. In one implementation, for example, an individual associated with a client with a Tier 2 level of access may be able to select one or more metrics through an interactive user interface, and a custom report may be generated based on the selected metrics. A client with a Tier 2 level of access may be able to interact with a generated report, so as to gain additional insight related to one or more indicators. For example, the portal may be configured to enable a client to engage in self-directed business diagnosis by drilling down into available data, so as to reveal additional information.

Clients having a Tier 2 level of access may also benefit from one or more guided analytics modules that provide advanced information and analyses. For example, a market intelligence module may be used to generate a report providing a high-level summary of market conditions, along with a plurality of indicators pertaining to a client's performance within the market. A category management module may be used to generate a report identifying growth opportunities and untapped potential for the client's business. A geographic dynamic module may be used to generate a report that identifies potential for the client's business based on geographic differences in market conditions. Other modules may also be provided.

A client having a Tier 3 level of access may benefit from one or more advanced applications that can be used to generate specific reports, and to provide additional functionality. Whereas the reports that may be generated for clients having a Tier for Tier 2 level of access generally provide a high-level overview of market conditions and/or various aspects of a client's business, the reports that may be generated using the applications available to clients with a Tier 3 level of access tend to be more focused, allowing for a deep dive into data relating to a particular topic. For example, applications available to a client with a Tier 3 level of access may be used to generate reports related to: (1) price optimization and competitive pricing strategies; (2) physicians within a geographic area; (3) customer demographics; (4) customer behavior; (5) customer persistency to drug therapy; or (6) product performance.

In more detail, and in one implementation, a price optimization application may generate a report based on an alignment associated with a client, the report including indicators derived from data contained in a database. The indicators included in the report generated by the price optimization application may be derived from information related to stores and to products, and can be used by the client to develop competitive pricing strategies, and to monitor the effectiveness of these strategies over time.

A physician focus application may be used to generate a report including indicators that highlight business growth opportunities relating to physicians within a geographic area. For example, high potential physicians within an area may be identified, and information relating to the client's share of physician scripts dispensed in the area may be presented. The indicators may be presented to a user, for example, in an actionable presentation layer that includes a map of the area, the map providing the locations of one or more of the high potential physicians.

As an alternative or in addition to the attached claims and the embodiments described above, at least the following embodiments 1 through 20 are also innovative.

Embodiment 1 is a computer-implemented method, the method comprising creating, by one or more processors, an alignment associated with a client, where the alignment organizes data in a database, and where the data in the database comprises prescription information, store information, and product information, receiving a request for a report, where the request identifies the client, and generating the requested report based on the alignment, where the report comprises one or more indicators derived from data contained in the database.

Embodiment 2 is the method of embodiment 1, where creating an alignment associated with a client comprises: creating, based on the data in the database, an alignment file comprising a list of one or more stores and one or more data fields for information associated with each listed store, where the information associated with each listed store comprises geographic information, and where each listed store is a retail store in a market that is relevant to the client, identifying one or more of the listed stores as client stores, and identifying, based on geographic information, one or more of the listed stores as competitors of one or more of the client stores.

Embodiment 3 is the method of embodiment 2, where the alignment file further comprises one or more data fields for information associated with products sold at one or more of the listed stores.

Embodiment 4 is the method of any one of embodiments 1 through 3, where receiving a request for a report further comprises receiving a user name, identifying the client based on the user name, and identifying permissions associated with the user name, and where generating the requested report based on the alignment further comprises generating the requested report based on the identified permissions.

Embodiment 5 is the method of any one of embodiments 1 through 4, where the one or more indicators in the generated report compare the performance of the client with the performance of one or more competitors in a relevant market.

Embodiment 6 is the method of any one of embodiments 1 through 5, further comprising: receiving one or more indications of one or more selected metrics, where generating the requested report based on the alignment further comprises generating the requested report based on the selected metrics, and where the one or more indicators in the generated report correspond to one or more of the selected metrics.

Embodiment 7 is the method of any of embodiments 1 through 6, further comprising: receiving a request for an additional report, where the request identifies the client, and where the request indicates a specific type of the additional report, generating the requested additional report based on the alignment, wherein the additional report comprises one or more indicators derived from data contained in the database, and where the one or more indicators in the generated additional report correspond to the specific type of the additional report.

Embodiment 8 is the method of any of embodiments 1 through 7, where the store information comprises data relating to one or more stores in a retail pharmaceutical market, and where the one or more stores sell prescription drugs to the general public.

Embodiment 9 is a system comprising one or more processing devices, and a non-transitory computer-readable medium coupled to the one or more processing devices having instructions stored thereon which, when executed by the one or more processing devices, cause the one or more processing devices to perform the method of any one of embodiments 1 through 8.

Embodiment 10 is a computer-readable non-transitory storage medium encoded with a computer program, the program comprising instructions that when executed by data processing apparatus cause the data processing apparatus to perform the method of any one of embodiments 1 through 8.

Embodiment 11 is a computer-implemented method, the method comprising creating, by one or more processors, an alignment associated with a government or insurance client, where the alignment organizes data in a database, and where the data in the database comprises prescription information, product information, and geography information, receiving a request for a report, where the request identifies the client, and generating the requested report based on the alignment, where the report comprises one or more indicators derived from data contained in the database.

Embodiment 12 is the method of embodiment 11, where creating an alignment associated with a government or insurance client comprises: creating, based on the data in the database, an alignment file comprising one or more data fields for geographic information.

Embodiment 13 is the method of embodiment 12, where the alignment file further comprises one or more data fields for information associated with products sold within a geographic area.

Embodiment 14 is the method of any one of embodiments 11 through 13, where receiving a request for a report further comprises receiving a user name, identifying the client based on the user name, and identifying permissions associated with the user name, and where generating the requested report based on the alignment further comprises generating the requested report based on the identified permissions.

Embodiment 15 is the method of any one of embodiments 11 through 14, where the one or more indicators in the generated report provide information related to a relevant market.

Embodiment 16 is the method of any one of embodiments 11 through 15, further comprising: receiving one or more indications of one or more selected metrics, where generating the requested report based on the alignment further comprises generating the requested report based on the selected metrics, and where the one or more indicators in the generated report correspond to one or more of the selected metrics.

Embodiment 17 is the method of any of embodiments 11 through 16, further comprising: receiving a request for an additional report, where the request identifies the government or insurance client, and where the request indicates a specific type of the additional report, generating the requested additional report based on the alignment, wherein the additional report comprises one or more indicators derived from data contained in the database, and where the one or more indicators in the generated additional report correspond to the specific type of the additional report.

Embodiment 18 is the method of any of embodiments 11 through 17, where the geographic information comprises data relating to a retail pharmaceutical market in a particular geographic area.

Embodiment 19 is a system comprising one or more processing devices, and a non-transitory computer-readable medium coupled to the one or more processing devices having instructions stored thereon which, when executed by the one or more processing devices, cause the one or more processing devices to perform the method of any one of embodiments 11 through 18.

Embodiment 20 is a computer-readable non-transitory storage medium encoded with a computer program, the program comprising instructions that when executed by data processing apparatus cause the data processing apparatus to perform the method of any one of embodiments 11 through 18.

The foregoing merely illustrates the principles of the disclosed subject matter. It will thus be appreciated that those skilled in the art will be able to devise numerous systems and methods which, although not explicitly shown or described herein, embody the principles of the disclosed subject matter and thus are within the spirit and scope of the disclosed subject matter.

What is claimed is:

1. A computer-implemented method comprising:
 receiving, from a client device and by a data processing module of a computer system that includes (i) the data processing module, (ii) a computational module, (iii) an output module, and (iv) one or more databases, data indicating a report request that identifies:
  a first transaction source from among a plurality of transaction sources, and a performance metric for to the first transaction source;
in response to receiving the data indicating the report request:
   obtaining, by the data processing module of the computer system and from a first set of database systems configured to exchange data with the computer system over a second network, a first stream of transaction data including one or more transaction records for the first transaction source;
   obtaining, by the data processing module of the computer system and from a second set of database systems configured to exchange data with the computer system over the second network, a second stream of transaction data including one or more transaction records for a second transaction source within the plurality of transaction sources that is not the first transaction source;
processing, by the data processing module of the computing system, contents of the one or more transaction records for the first transaction source to generate a first relational database model, the processing comprising:
   identifying transaction records that are distributed at the first transaction source;
   determining, for each of the transaction records, a total number of transactions at the first transaction source that are associated with a transaction record;
   generating, within the one or more databases, the first relational database model specifying the total number of transactions for each of the transaction records at the first transaction source;
processing, by the computing system, contents of the one or more transaction records for the second pharmacy to generate a second relational database model, the processing comprising:
   identifying transaction records that are distributed at the designated transaction source;
   determining, for each of the transaction records, a total number of transactions at the second transaction source that are associated with a transaction record;
   generating, within the one or more databases, the second relational database model specifying the total number of transactions for each of the transaction records at the second transaction source;
generating, by the data processing module of the computing system and within the one or more databases, a mapping between the first relational database model and the second relational database model;
comparing, by the computational module of the computer system and using the longitudinal mapping, corresponding data fields within the first relational database model and the second relational database model;
computing, by the computational module of the computer system and for the first transaction source, a performance score corresponding to the performance metric for the first transaction source identified within the report request based on comparing the corresponding data fields within the first relational database model and the second relational model;
generating, by the output module of the computer system, a report responsive to the received report request, the report including the computed performance score for the first transaction source; and
providing, by the output module of the computer system, the generated report for output to the client device over the first network.

2. The method of claim 1, further comprising:
identifying, by the computational module of the computer system, a user associated with the client device based on a username identified by the received report request; and
identifying, by the computational module of the computer system, a set of permissions associated with the username;
wherein the requested report is generated based at least on the set of permissions associated with the username.

3. The method of claim 1, wherein at the computed performance score included in the generated report represents a relative increase in distribution of a transaction record at the first transaction source compared to a corresponding increase in distribution of the transaction record at the second transaction source.

4. The method of claim 1, further comprising:
receiving, by the data processing module of the computer system and from the client device over the first network, one or more user inputs selecting a transaction record from among the transaction records; and
adjusting, by the data processing module of the computer system and within the one or more databases, the first relational database model and the second relational database model to include one or more transaction records of the transaction record; and
wherein the performance score corresponding to the performance metric for the first transaction source is computed based on comparing the contents of the adjusted first relational database model and the adjusted second relational database model.

5. The method of claim 1, further comprising:
receiving, by the data processing module of the computer system and from the client device, data indicating a request for an additional report, the request for the additional report identifying the first transaction source and information relating to one or more additional performance metrics that are different from the performance metric for the first transaction source identified within the report request;
computing, by the computational module of the computer system, additional performance scores corresponding to the additional performance metrics based on comparing the contents of the first relational database model and the contents of the second relational model; and
generating, by the output module of the computer system, an additional report that includes the computed one or more additional performance scores.

6. A non-transitory computer-readable storage device encoded with computer program instructions that, when executed by one or more computers, cause the one or more computers to perform operations comprising:
receiving, from a client device and by a data processing module of a computer system that includes (i) the data processing module, (ii) a computational module, (iii) an output module, and (iv) one or more databases, data indicating a report request that identifies:
   a first transaction source from among a plurality of transaction sources, and
   a performance metric for to the first transaction source;
in response to receiving the data indicating the report request:
   obtaining, by the data processing module of the computer system and from a first set of database systems configured to exchange data with the computer system over a second network, a first stream of transaction data including one or more transaction records for the first transaction source;

obtaining, by the data processing module of the computer system and from a second set of database systems configured to exchange data with the computer system over the second network, a second stream of transaction data including one or more transaction records for a second transaction source within the plurality of transaction sources that is not the first transaction source;

processing, by the data processing module of the computing system, contents of the one or more transaction records for the first transaction source to generate a first relational database model, the processing comprising:

identifying transaction records that are distributed at the first transaction source;

determining, for each of the transaction records, a total number of transactions at the first transaction source that are associated with a transaction record;

generating, within the one or more databases, the first relational database model specifying the total number of transactions for each of the transaction records at the first transaction source;

processing, by the computing system, contents of the one or more transaction records for the second pharmacy to generate a second relational database model, the processing comprising:

identifying transaction records that are distributed at the designated transaction source;

determining, for each of the transaction records, a total number of transactions at the second transaction source that are associated with a transaction record;

generating, within the one or more databases, the second relational database model specifying the total number of transactions for each of the transaction records at the second transaction source;

generating, by the data processing module of the computing system and within the one or more databases, a mapping between the first relational database model and the second relational database model;

comparing, by the computational module of the computer system and using the longitudinal mapping, corresponding data fields within the first relational database model and the second relational database model;

computing, by the computational module of the computer system and for the first transaction source, a performance score corresponding to the performance metric for the first transaction source identified within the report request based on comparing the corresponding data fields within the first relational database model and the second relational model;

generating, by the output module of the computer system, a report responsive to the received report request, the report including the computed performance score for the first transaction source; and providing, by the output module of the computer system, the generated report for output to the client device over the first network.

7. The device of claim 6, wherein the operations further comprise:

identifying, by the computational module of the computer system, a user associated with the client device based on a username identified by the received report request; and identifying, by the computational module of the computer system, a set of permissions associated with the username;

wherein the requested report is generated based at least on the set of permissions associated with the username.

8. The device of claim 6, wherein at the computed performance score included in the generated report represents a relative increase in distribution of a transaction record at the first transaction source compared to a corresponding increase in distribution of the transaction record at the second transaction source.

9. The device of claim 6, wherein the operations further comprise:

receiving, by the data processing module of the computer system and from the client device over the first network, one or more user inputs selecting a transaction record from among the transaction records; and adjusting, by the data processing module of the computer system and within the one or more databases, the first relational database model and the second relational database model to include one or more transaction records of the transaction record; and wherein the performance score corresponding to the performance metric for the first transaction source is computed based on comparing the contents of the adjusted first relational database model and the adjusted second relational database model.

10. The device of claim 6, wherein the operations further comprise:

receiving, by the data processing module of the computer system and from the client device over the first network, one or more user inputs selecting a transaction record from among the transaction records; and adjusting, by the data processing module of the computer system and within the one or more databases, the first relational database model and the second relational database model to include one or more transaction records of the transaction record; and wherein the performance score corresponding to the performance metric for the first transaction source is computed based on comparing the contents of the adjusted first relational database model and the adjusted second relational database model.

11. A system comprising:

one or more computers; and one or more storage devices storing instructions that, when executed by the one or more computers, cause the one or more computers to perform operations comprising:

receiving, from a client device and by a data processing module of a computer system that includes (i) the data processing module, (ii) a computational module, (iii) an output module, and (iv) one or more databases, data indicating a report request that identifies:

a first transaction source from among a plurality of transaction sources, and a performance metric for to the first transaction source;

in response to receiving the data indicating the report request:

obtaining, by the data processing module of the computer system and from a first set of database systems configured to exchange data with the computer system over a second network, a first stream of transaction data including one or more transaction records for the first transaction source;

obtaining, by the data processing module of the computer system and from a second set of database systems configured to exchange data with the computer system over the second network, a second stream of transaction data including one or more transaction records for a second transaction source within the plurality of transaction sources that is not the first transaction source;

processing, by the data processing module of the computing system, contents of the one or more transaction records for the first transaction source to generate a first relational database model, the processing comprising:
identifying transaction records that are distributed at the first transaction source;
determining, for each of the transaction records, a total number of transactions at the first transaction source that are associated with a transaction record;
generating, within the one or more databases, the first relational database model specifying the total number of transactions for each of the transaction records at the first transaction source;

processing, by the computing system, contents of the one or more transaction records for the second pharmacy to generate a second relational database model, the processing comprising:
identifying transaction records that are distributed at the designated transaction source;
determining, for each of the transaction records, a total number of transactions at the second transaction source that are associated with a transaction record;
generating, within the one or more databases, the second relational database model specifying the total number of transactions for each of the transaction records at the second transaction source;

generating, by the data processing module of the computing system and within the one or more databases, a mapping between the first relational database model and the second relational database model;

comparing, by the computational module of the computer system and using the longitudinal mapping, corresponding data fields within the first relational database model and the second relational database model;

computing, by the computational module of the computer system and for the first transaction source, a performance score corresponding to the performance metric for the first transaction source identified within the report request based on comparing the corresponding data fields within the first relational database model and the second relational model;

generating, by the output module of the computer system, a report responsive to the received report request, the report including the computed performance score for the first transaction source; and providing, by the output module of the computer system, the generated report for output to the client device over the first network.

12. The system of claim 11, wherein the operations further comprise:
identifying, by the computational module of the computer system, a user associated with the client device based on a username identified by the received report request; and
identifying, by the computational module of the computer system, a set of permissions associated with the username;
wherein the requested report is generated based at least on the set of permissions associated with the username.

13. The system of claim 11, wherein at the computed performance score included in the generated report represents a relative increase in distribution of a transaction record at the first transaction source compared to a corresponding increase in distribution of the transaction record at the second transaction source.

14. The system of claim 11, further comprising:
receiving, by the data processing module of the computer system and from the client device over the first network, one or more user inputs selecting a transaction record from among the transaction records; and
adjusting, by the data processing module of the computer system and within the one or more databases, the first relational database model and the second relational database model to include one or more transaction records of the transaction record; and
wherein the performance score corresponding to the performance metric for the first transaction source is computed based on comparing the contents of the adjusted first relational database model and the adjusted second relational database model.

15. The system of claim 11, further comprising:
receiving, by the data processing module of the computer system and from the client device, data indicating a request for an additional report, the request for the additional report identifying the first transaction source and information relating to one or more additional performance metrics that are different from the performance metric for the first transaction source identified within the report request;
computing, by the computational module of the computer system, additional performance scores corresponding to the additional performance metrics based on comparing the contents of the first relational database model and the contents of the second relational model; and
generating, by the output module of the computer system, an additional report that includes the computed one or more additional performance scores.

* * * * *